US009748838B2

(12) United States Patent
Chew et al.

(10) Patent No.: US 9,748,838 B2
(45) Date of Patent: Aug. 29, 2017

(54) METHOD OF OPERATING A CONTROLLER FOR A POWER CONVERTER, AND A CORRESPONDING CONTROLLER

(71) Applicant: NANYANG TECHNOLOGICAL UNIVERSITY, Singapore (SG)

(72) Inventors: Kin Wai Roy Chew, Singapore (SG); Liter Siek, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 753 days.

(21) Appl. No.: 14/196,419

(22) Filed: Mar. 4, 2014

(65) Prior Publication Data
US 2014/0246908 A1 Sep. 4, 2014

Related U.S. Application Data

(60) Provisional application No. 61/772,279, filed on Mar. 4, 2013.

(51) Int. Cl.
*H02J 1/00* (2006.01)
*H02J 3/00* (2006.01)
(Continued)

(52) U.S. Cl.
CPC ........... *H02M 3/158* (2013.01); *H02J 7/0029* (2013.01); *H02J 7/04* (2013.01); *H02J 7/35* (2013.01);
(Continued)

(58) Field of Classification Search
CPC .......... H02J 7/0052; H02J 7/0029; H02J 7/35; H02J 7/04; H02Q 2209/883;
(Continued)

(56) References Cited

U.S. PATENT DOCUMENTS

2012/0205974 A1\* 8/2012 McCaslin ............... H02J 3/385
307/18
2013/0307340 A1\* 11/2013 Subramanium ........... H02J 5/00
307/72

(Continued)

OTHER PUBLICATIONS

Chew et al., "A 400nW Single-Inductor Dual-Input-Tri-Output DC-DC Buck-Boost Converter with Maximum Power Point Tracking for Indoor Photovoltaic Energy Harvesting", IEEE International Solid-State Circuits Conference(ISSCC) 2013, Session 4, Harvesting & Wireless Power, 4.3, Feb. 2013, (3 pages total).

*Primary Examiner* — Arnold Kinkead
(74) *Attorney, Agent, or Firm* — Sughrue Mion, PLLC

(57) ABSTRACT

A method of operating a controller for a power converter having a plurality of switches couplable to respective electrical devices is disclosed, in which the controller includes a switch activating unit, a frequency varying unit, a comparator and a selector. The method comprises comparing respective electrical parameters of the electrical devices with respective reference electrical parameters by the comparator to obtain associated results; and based on the results, selecting by the selector either no switches or at least one switch to be activated to enable at least two electrical devices to be electrically connected. The activation is performed on receipt of a signal pulse, and if no switches are selected, the signal pulse is skipped by the switch activating unit to reduce power consumption of the controller, and based on the results, a frequency of the signal pulse is varied by the frequency varying unit to further reduce power consumption of the controller. A controller is also disclosed.

25 Claims, 16 Drawing Sheets

(51) Int. Cl.
*H02M 3/158* (2006.01)
*H02J 7/35* (2006.01)
*H04Q 9/00* (2006.01)
*H02J 7/04* (2006.01)
*H02M 7/04* (2006.01)
*H02M 3/04* (2006.01)
*H02J 7/00* (2006.01)
*H02M 3/156* (2006.01)

(52) U.S. Cl.
CPC .............. *H02M 3/04* (2013.01); *H02M 3/156* (2013.01); *H02M 7/04* (2013.01); *H04Q 9/00* (2013.01); *H02M 3/1582* (2013.01); *Y10T 307/352* (2015.04); *Y10T 307/406* (2015.04)

(58) Field of Classification Search
CPC ................. H02Q 2209/40; H02Q 9/00; H04Q 2209/883; H04Q 2209/40; H04Q 9/00; H02M 7/04; H02M 3/1582; H02M 3/158; H02M 3/156; H02M 3/04; Y10T 307/532; Y10T 307/406
USPC .......... 307/31, 24, 82; 363/95; 323/234, 311
See application file for complete search history.

(56) References Cited

U.S. PATENT DOCUMENTS

| | | | |
|---|---|---|---|
| 2015/0130394 A1* | 5/2015 | Chang | H02J 7/35 320/101 |
| 2015/0256097 A1* | 9/2015 | Gudan | H02M 3/338 363/125 |
| 2016/0345081 A1* | 11/2016 | Yamada | H04Q 9/00 |

* cited by examiner

|  | [3] | [4] | [2] | This Work |
|---|---|---|---|---|
| Output voltage | 2V | 5.5V | 3V | 1V, 1.8V and 3V |
| Output power | 10µW to 1mW | 621µW | 5µW to 10mW | 1µW to 10mW |
| Power consumption of control circuit | 2.4µW | 135µW | 1.95µW | 0.4µW |
| Architecture | Integrated charge pump | Inductive boost converter | Inductive boost converter | Inductive buck-boost converter |
| Peak conversion efficiency | 70% | 76% | 87% (w/o MPPT) 70% (with MPPT) | 83% (with MPPT) |

Figure 15

METHOD OF OPERATING A CONTROLLER FOR A POWER CONVERTER, AND A CORRESPONDING CONTROLLER

FIELD & BACKGROUND

The present invention relates to a method of operating a controller for a power converter, and a corresponding controller.

Energy harvesting enables remote sensors of a wireless sensor network to obtain power from the environment for their entire operational lifetime. For indoor remote sensors, amorphous silicon photovoltaic (PV) cell can be used to harvest energy from indoor lighting, thus functioning as an energy-harvesting (EH) source. Furthermore, if the power consumption of the sensor is low, e.g., the image sensor in [1], the power rating of the PV cell is limited to tens or hundreds of microwatts to minimize the form factor of the sensor. However, as the output power of the PV cell varies greatly with illumination level [2] and the output voltage of the PV cell ($V_{PV}$), an energy storage (ES) device, such as a battery, is required to regulate the harvester's output power. Furthermore, a DC-DC converter with a maximum power point tracker (MPPT) is needed to lock the PV cell at its maximum power point (MPP).

Image sensors usually require a high supply voltage (e.g. 1.8V in [1]), to achieve sufficient sensitivity. However, digital blocks need to ideally operate at 1V or less to minimize power consumption. As a result, the remote sensor would require at least two power rails to optimize its performance. In [2-4], harvested energy only recharges the battery, thus requiring an additional power converter to deliver energy from the battery to the load (and elaborated below). So, two steps of power conversion are required, which reduces the overall conversion efficiency.

Pulse-Skipping Modulation (PSM) Controller

In [2], an inductive power converter is implemented, which is able to regulate output voltages to a continuous range of values. The controller of the power converter operates with pulse-skipping modulation (PSM) to achieve a low static power consumption of 1.95 µW. Specifically, the controller of the PSM is configured to skip several clock pulses between two switching activities to minimize switching losses when the power level is low. The number of clock pulses to be skipped depends on an amount of power harvested from the PV cell and the required voltage level for maximum power point tracking of the PV cell. A nano-power reference circuit and a relaxation oscillator are also included in the controller.

Proportional-Integral (PI) Controller

Since the power harvested can reach as low as several microwatts, a challenge is to design the controller of a power converter to consume minimal power to ensure high efficiency. Furthermore, the power converter needs to be capable of handling a large range of input and output power as the harvested power may vary by several orders of magnitude, depending on environmental conditions. For example, in [3], the power converter is implemented with two Pulse-Width Modulation (PWM) converters using proportional-integral control. As the design uses several integrated circuits and the conventional proportional-integral control, the power consumption of the said controller is relatively high, at 135 µW.

Switch-Capacitor Power Converter

In [4], a switch-capacitor power converter architecture is implemented with a controller power consumption of 2.4 µW. The said power converter is controlled by a relaxation oscillator, which varies its switching frequency accordingly to the power level. As such, the switching frequency can be reduced when the harvested power is low to reduce power consumption in the controller.

For this design, a linear voltage regulator is used to regulate the power supply of the oscillator, which consumes a significant amount of DC power regardless of the power level. Moreover, the relaxation oscillator, as configured, requires two reference voltages to be generated and two comparators to perform voltage comparisons. As both the reference voltages and comparators consume a considerable amount of static power, further reduction in controller power consumption is limited. Moreover, the switch-capacitor power converter architecture can only regulate the output voltage to discrete levels.

Dual-Input-Dual-Output Power Converter

In the three above designs described, the respective power converters are configured to only transfer the input power from the EH source (e.g. a PV cell) to recharge the ES device (e.g. a battery). As a result, an additional power converter is needed to interface between the energy storage and the load (LD) and thus inadvertently reduces the overall power efficiency of the associated system. In [5], the power converter is capable of transferring the harvested power to both the ES source and the LD in one conversion step, thereby improving the overall power efficiency. However, the controller in [5] uses lead-lag compensation, which requires error amplifiers, and comparators. Both the error amplifiers and comparators consume a significant amount of static power and undesirably result in relatively high controller power consumption.

One object of the present invention is therefore to address at least one of the problems of the prior art and/or to provide a choice that is useful in the art.

SUMMARY

According to a $1^{st}$ aspect of the invention, there is provided a controller for a power converter having a plurality of switches couplable to respective electrical devices. The controller comprises a switch activating unit for activating the switches; a frequency varying unit; a comparator configured to compare respective electrical parameters of the electrical devices with respective reference electrical parameters to obtain associated results; and a selector configured to select based on the results, either no switches or at least one switch to be activated to enable at least two electrical devices to be electrically connected. The activation is performed on receipt of a signal pulse, and if no switches are selected, the signal pulse is skipped by the switch activating unit to reduce power consumption of the controller, and based on the results, a frequency of the signal pulse is varied by the frequency varying unit to further reduce power consumption of the controller.

Advantages of the proposed controller include enabling voltage regulation of the electrical devices (e.g. energy storage devices, energy harvesting devices and voltage regulatable devices) based on results of the voltage comparison, and the signal pulse may be skipped and a frequency of providing the signal pulse may be varied depending on the results (so that the switches are not activated) in order that quiescent power consumption and power conversion efficiency of the power converter are optimized.

It is also to be appreciated that in the context of the invention, "the signal pulse is skipped" is defined herein as in a case in which the signal pulse is generated but the selector does not select any switches to be activated (based on the results), no switching pulse is then consequently generated by the selector and transmitted to the switch activating unit, which thus results in the "skipping" of the signal pulse.

The plurality of electrical devices may include energy storage devices, energy harvesting devices and voltage regulatable devices, and the switches may include at least first to fourth sets of switches to selectably connect an energy harvesting device and a voltage regulatable device, or an energy storage device and a voltage regulatable device, or an energy storage device and an energy harvesting device. The energy storage devices may include batteries and/or ultra-capacitors, whereas the energy harvesting devices may include photovoltaic cells and/or piezoelectric micro-power generators. Preferably, the first set of switches may be configured to be coupled to the energy harvesting devices, the second set of switches may be configured to be coupled to the energy storage devices, the third set of switches may be configured to be coupled to the voltage regulatable devices, and the fourth set of switches may be configured to be coupled to the energy harvesting devices. The comparator may include a memory device to store digital codes corresponding to at least some of the reference electrical parameters. In addition, the comparator may further include a Digital-to-Analog Converter (DAC) to convert the digital codes into the at least some of the reference electrical parameters. The DAC may include a Capacitive DAC (CDAC) and has a resolution of 8-bits.

Preferably, the comparator may include a double-tail latch-type dynamic comparator. The frequency varying unit may be configured to periodically generate the signal pulse, or alternatively the frequency varying unit may be configured to receive the signal pulse. The frequency varying unit may include a dual threshold CMOS relaxation oscillator having a dynamic threshold inverter.

Also, the dynamic threshold inverter may be arranged to use two different threshold voltages to periodically generate the signal pulse.

Preferably, activation of the at least one switch may include sequentially activating the at least one switch to enable transfer of electrical energy between the at least two electrical devices. The comparator and selector may be configured to be switched off prior to receipt of the signal pulse. The electrical parameters may include voltages. Moreover, no switches may be selected if no energy harvesting device has a voltage higher than a first reference voltage being compared with, and no voltage regulatable device has a voltage lower than a second reference voltage being compared with.

The comparator may be further configured to compare the electrical parameters of the electrical devices with the reference electrical parameters upon receipt of the signal pulse. Varying the frequency may include increasing the frequency if at least one energy harvesting device is consecutively determined to have a voltage higher than a first reference voltage being compared with, or at least one voltage regulatable device is consecutively determined to have a voltage lower than a second reference voltage being compared with. Specifically, increasing the frequency may include doubling the frequency.

Varying the frequency may also include decreasing the frequency if at least one energy harvesting device is consecutively determined to have a voltage lower than a first reference voltage being compared with, or at least one voltage regulatable device is consecutively determined to have a voltage higher than a second reference voltage being compared with. Specifically, decreasing the frequency may include halving the frequency.

Yet preferably, the comparator may further include a voltage multiplexer configured to receive the respective electrical parameters of the electrical devices to generate a first signal; a digital reference multiplexer configured to receive the respective reference electrical parameters to generate a second signal; and a dynamic comparator configured to receive the first and second signals for performing the comparison. Usage of the voltage multiplexer and digital reference multiplexer may enable only one DAC and one dynamic comparator to be arranged in the controller to reduce a chip size thereof.

According to a $2^{nd}$ aspect of the invention, there is provided a power converter having a controller and a plurality of switches couplable to respective electrical devices. The controller includes a switch activating unit for activating the switches; a frequency varying unit; a comparator configured to compare respective electrical parameters of the electrical devices with respective reference electrical parameters to obtain associated results; and a selector configured to select based on the results, either no switches or at least one switch to be activated to enable at least two electrical devices to be electrically connected. The activation is performed on receipt of a signal pulse, and if no switches are selected, the signal pulse is skipped by the switch activating unit to reduce power consumption of the controller, and based on the results, a frequency of the signal pulse is varied by the frequency varying unit to further reduce power consumption of the controller.

The power converter may be configured for a wireless sensor operable using energy harvesting.

According to a $3^{rd}$ aspect of the invention, there is provided a method of operating a controller for a power converter having a plurality of switches couplable to respective electrical devices, and the controller includes a switch activating unit, a frequency varying unit, a comparator and a selector. The method comprises comparing respective electrical parameters of the electrical devices with respective reference electrical parameters by the comparator to obtain associated results; and based on the results, selecting by the selector either no switches or at least one switch to be activated to enable at least two electrical devices to be electrically connected. The activation is performed on receipt of a signal pulse, and if no switches are selected, the signal pulse is skipped by the switch activating unit to reduce power consumption of the controller, and based on the results, a frequency of the signal pulse is varied by the frequency varying unit to further reduce power consumption of the controller.

It should be apparent that features relating to one aspect of the invention may also be applicable to the other aspects of the invention.

These and other aspects of the invention will be apparent from and elucidated with reference to the embodiments described hereinafter.

BRIEF DESCRIPTION OF THE DRAWINGS

Embodiments of the invention are disclosed hereinafter with reference to the accompanying drawings, in which:

FIG. 15 is a table of comparison for the state-of-the-art energy harvesters.

DETAILED DESCRIPTION OF PREFERRED EMBODIMENTS

Figure 1:
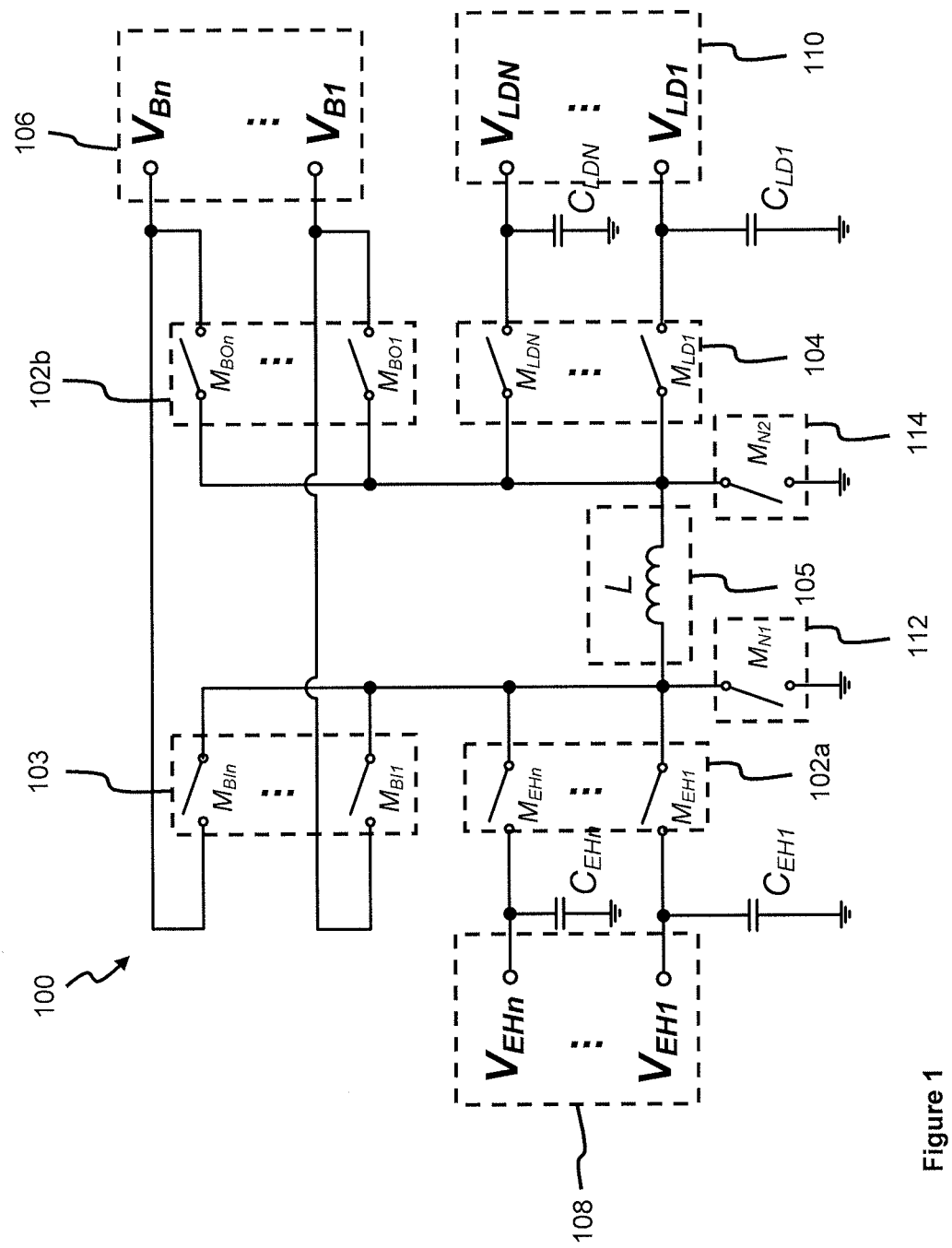
FIG. 1 shows the schematic of a Single-Inductor Multiple-Input-Multiple-Output (SIMIMO) DC-DC (Buck-Boost) converter.
Figure 2:
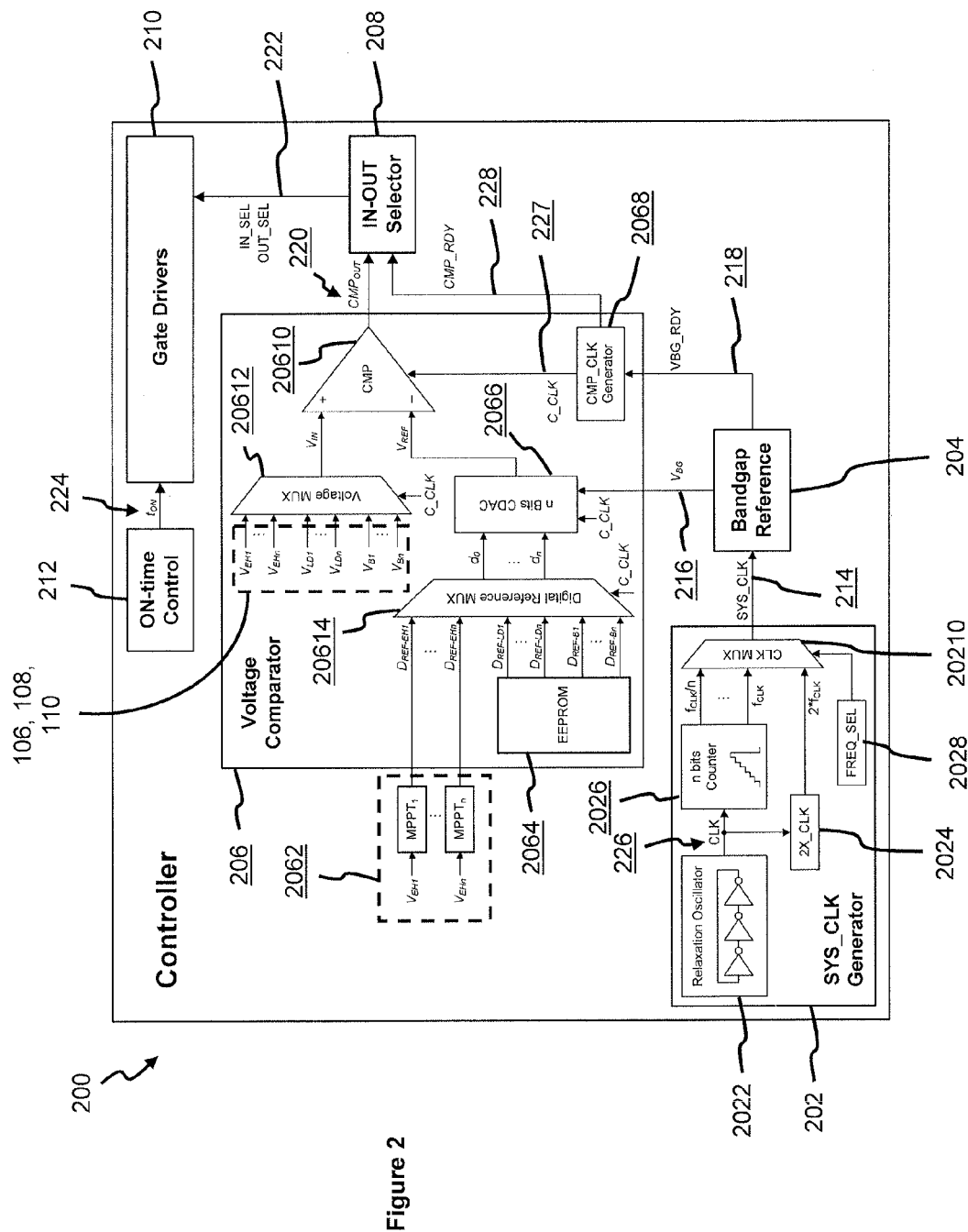
FIG. 2 shows the circuit architecture of a controller of the DC-DC converter of FIG. 1, according to a first embodiment.

FIG. 1 shows a schematic of a Single-Inductor Multiple-Input-Multiple-Output (SIMIMO) DC-DC (Buck-Boost) converter 100, and FIG. 2 shows the circuit architecture of a controller 200 for the DC-DC converter 100, according to a first embodiment. Specifically, the DC-DC converter 100 is advantageously adapted for a sensor (not shown) which operates using energy harvesting, and thus the sensor is usable in a wireless sensor network. As shown in FIG. 1, the DC-DC converter 100 is collectively arranged with multiple switches, comprising a first set of input switches 102a, a second set of input switches 102b, a third set of input switches 103, and a fourth set of switches 104, being hereinafter termed as output switches 104. A switch pair 102a, 102b, 104 is formed when two selected switches 102a, 102b, 104 are closed, and the switch pair 102a, 102b, 104 can be formed from any of the following combinations: an input switch 102a from the first set of input switches 102a and an input switch 102b from the second set of input switches 102b, or an input switch 102a from the first set of input switches 102a and an output switch 104, or an input switch 102b from the second input switch 102b and an output switch 104. It is also to be appreciated that a switch pair 102a, 102b, 104 may alternatively be termed a port pair. It is to be highlighted that the first set of input switches 102a, and the third set of input switches 103 are arranged at a first side of the DC-DC converter 100, whilst the second set of input switches 102b and the output switches 104 are arranged at a second opposite side of the DC-DC converter 100, with an inductor 105 arranged between the first and second sides of the DC-DC converter 100.

To explain, the second set of input switches 102b are respectively coupled to the energy storage (ES) devices 106 (i.e. with voltages labeled as $V_{B1}$, $V_{B2}$ ... $V_{Bn}$) and the first set of input switches 102a are respectively coupled to the energy harvesting (EH) devices 108 (i.e. with voltages labeled as $V_{EH1}$, $V_{EH2}$ ... $V_{EHn}$), whereas the output switches 104 are respectively coupled to voltage regulatable devices 110 (i.e. with voltages labeled as $V_{LD1}$, $V_{LD2}$ ... $V_{LDn}$), which may be thought of as output loads. The third set of input switches 103 are respectively coupled to the energy storage (ES) devices 106 so that power can be drawn therefrom to augment the power of the energy harvesting (EH) devices 108 coupled to the first set of input switches 102a. So, the switch pairs 102a, 102b, 104 are thus respectively coupled to a plurality of electrical devices, being the energy storage devices 106, the energy harvesting devices 108, and the voltage regulatable devices 110. Examples of the energy storage devices 106 include batteries and/or ultra-capacitors, while the energy harvesting devices 108 include photovoltaic (PV) cells and/or piezoelectric micro-power generators [6]. It is also to be clarified and appreciated that the voltage regulatable devices 110 can be regulated to independent voltages, and thus each of the voltage regulatable devices 110 can also be viewed as an independent electrical load. Examples of the voltage regulatable devices 110 include sensors (e.g. image sensors or temperature sensors), Analog-to-Digital Converters (ADCs), digital processors, wireless transmitters and the like.

It is also to be appreciated that a first connecting switch 112 (i.e. labeled as "$M_{N1}$") arranged to be coupled to on the left side of the inductor 105, and a second connecting switch 114 (i.e. labeled as "$M_{N2}$") arranged to be coupled to on the right side of the inductor 105 are controlled by the controller 200 of FIG. 2. In particular, the controller 200 receives voltages input for comparison (to be further elaborated below) and then determines which connecting switch 112, 114 to be opened or closed. From FIG. 1, it will be appreciated that the second connecting switch 114 is configured to operate with the first set of input switches 102a and the third set of input switches 103, depending on a mode of operation. The second connecting switch 114 switches on when current flows through the inductor 105 (which requires one switch from either the first set of input switches 102a or the third set of input switches 103 to be closed). On the other hand, the first connecting switch 112 is configured to operate with the second set of input switches 102b and the output switches 104, depending on a mode of operation. For the first connecting switch 112 to switched on, current will have to flow through the inductor 105, which happens when one switch from either the second set of input switches 102b or the output switches 104 is closed.

It is to be further clarified that multiple switches from a same set of input/output switches 102a, 102b, 103, 104 may not be selected to be closed at the same time, since it will cause associated electrical devices 106, 108, 110 coupled to those multiple switches to be short circuited and damaged. Specifically, only one switch on each side of the inductor 105 can be selected to be closed for each switching cycle. For example, when a switch in the first set of input switches 102a is closed, all of the switches in the third set of input switches 103 must remain open (and vice-versa), while when a switch in the set of output switches 104 is closed, all of the switches in the second set of input switches 102b must remain open (and vice-versa). This is to ensure that all electrical devices 106, 108, 110 are isolated from one another. It is also to be highlighted that if one switch from the third set of input switches 103 is closed, then all switches in the second set of input switches 102b needs to remain open. This is because as switches in the third set of input switches 103 and the second set of input switches 102b are connected to corresponding energy storage devices 106, energy is thus wasted when power is drawn from an energy storage device 106 to recharge another energy storage devices 106.

We now turn to a discussion of the said controller 200. It is to be noted that while conventional proportional-integral (PI) or proportional-integral-derivative (PID) controllers and lead-lag compensators require considerable amount of static power (and thus are not suitable for power converters that are to be operated with only microwatts of input power), the proposed controller 200, 1000 is beneficially configured to utilize Pulse-Skipping Modulation (PSM) and Pulse-Frequency Modulation (PFM) in order to minimize the overall power consumed by the controller 200 (and consequently the DC-DC converter 100). This will be elaborated further below.

Controller Architecture

Referring to FIG. 2, the circuit architecture of the controller 200 is shown, in which the controller 200 includes the following modules/components: a frequency varying unit 202, a Bandgap Reference 204, a Voltage Comparator 206, an IN-OUT Selector 208, a Gate Drivers 210, and an ON-time Control 212. In this embodiment, the frequency varying unit 202 is configured to be arranged within the controller 200, and is termed a SYS_CLK Generator 202 hereinafter. The Bandgap Reference 204 is arranged to receive an internal clock signal, SYS_CLK 214, from the SYS_CLK Generator 202, and thereafter provide two different signals, $V_{BG}$ 216 and $V_{BG\_RDY}$ 218, to the Voltage Comparator 206. It is to be appreciated that $V_{BG}$ 216 is a reference voltage used by the Voltage Comparator 206. On the other hand, $V_{BG\_RDY}$ 218 is a digital trigger configured to indicate to the Voltage Comparator 206 that the reference voltage of $V_{BG}$ 216 has settled and ready to be used for comparison. The SYS_CLK Generator 202, in this instance, is thus arranged to periodically generate a signal pulse (i.e. the SYS_CLK clock signal 214). On the other hand, the Voltage Comparator 206 is arranged to receive measured voltage levels of the electrical devices 106, 108, 110 coupled to the DC-DC converter 100, as well as a first set of reference voltages provided by a plurality of Maximum Power Point Trackers (MPPTs) 2062 to ensure all the energy harvesting devices 108 operate at respective MPPs. To clarify, an energy harvesting device 108 is arranged with an operating voltage level, in which a maximum amount of power can be harvested. This said operating voltage level is known as the Maximum Power Point (MPP). Under different environmental conditions, the MPP shifts. Thus, an MPPT is a circuit or system that tracks the MPP of the corresponding energy harvesting device 108 to ensure that the associated energy harvesting device 108 can always be configured to operate at its MPP under varying environmental conditions. Specifically, the Voltage Comparator 206 compares the respective voltage levels of the energy harvesting devices 108 with the first set of reference voltages. A second set of reference voltages is provided by a memory device 2064 (e.g. an EEPROM) of the Voltage Comparator 206, in which the respective voltage levels of the energy storage devices 106 and voltage regulatable devices 110 are then compared with this second set of reference voltages. In summary, the Voltage Comparator 206 compares the respective voltage levels of the electrical devices 106, 108, 110 with the first and second sets of reference voltages to obtain associated voltage comparison results. The Voltage Comparator 206 consequently provides a plurality of $CMP_{OUT}$ signals 220, each sequentially transmitted and corresponding to individual voltage comparison result, to the IN-OUT Selector 208. The IN-OUT Selector 208 makes a determination after when in receipt of all the comparison results and transmits an IN_SEL_and_OUT_SEL control signal 222 to the Gate Drivers 210. The IN_SEL_and_OUT_SEL control signal 222 includes information on a source and load pair (respectively coupled to a corresponding switch pair 102a, 102b, 103, 104 to be activated) selected by the IN-OUT Selector 208, based on the comparison results. That is, it will be appreciated that the Gate Drivers 210 is a switch activating unit for activating a switch pair 102a, 102b, 103, 104. Lastly, the ON-time Control 212 is configured to send a $t_{ON}$ signal 224 to the Gate Drivers 210. The Gate Drivers 210 is in turn operatively coupled to the multiple switch pairs 102a, 102b, 104 of the DC-DC converter 100.

Pulse-Skipping Modulation (PSM), Pulse-Frequency Modulation (PFM) and IN-OUT Selector It is to be appreciated that voltage regulation is achieved by transferring electrical energy from (input) sources with excess electrical energy to (output) loads that are low in electrical energy. Since an amount of electrical energy stored is reflected in the voltage level measured, so for any of the energy harvesting devices 108 having voltage levels higher than the respective reference voltages being compared against (e.g. $V_{EH1}>V_{REF\text{-}EH1}$), those energy harvesting devices 108 thus possess excess electrical energy (e.g. as stored in the associated capacitors) which can be transferred to a desired load that is low on electrical energy. Energy storage devices 106 can also act as the sources, if determined to have excess electrical energy. For a load, when the voltage level measured is lower than the associated reference voltage, it means that the load is low in electrical energy and needs to be refilled with electrical energy. The energy storage devices 106 and voltage regulatable devices 110 can be selected as the load. As explained, the IN-OUT Selector 208 selects a source and load pair, according to the $CMP_{OUT}$ signals 220 received from the Voltage Comparator 206. A source and load pair can be any of the following combinations: an energy harvesting device 108 transferring to a voltage regulatable device 110, or an energy storage device 106 transferring to a voltage regulatable device 110, or an energy harvesting device 108 transferring to an energy storage device 106.

Figure 4:
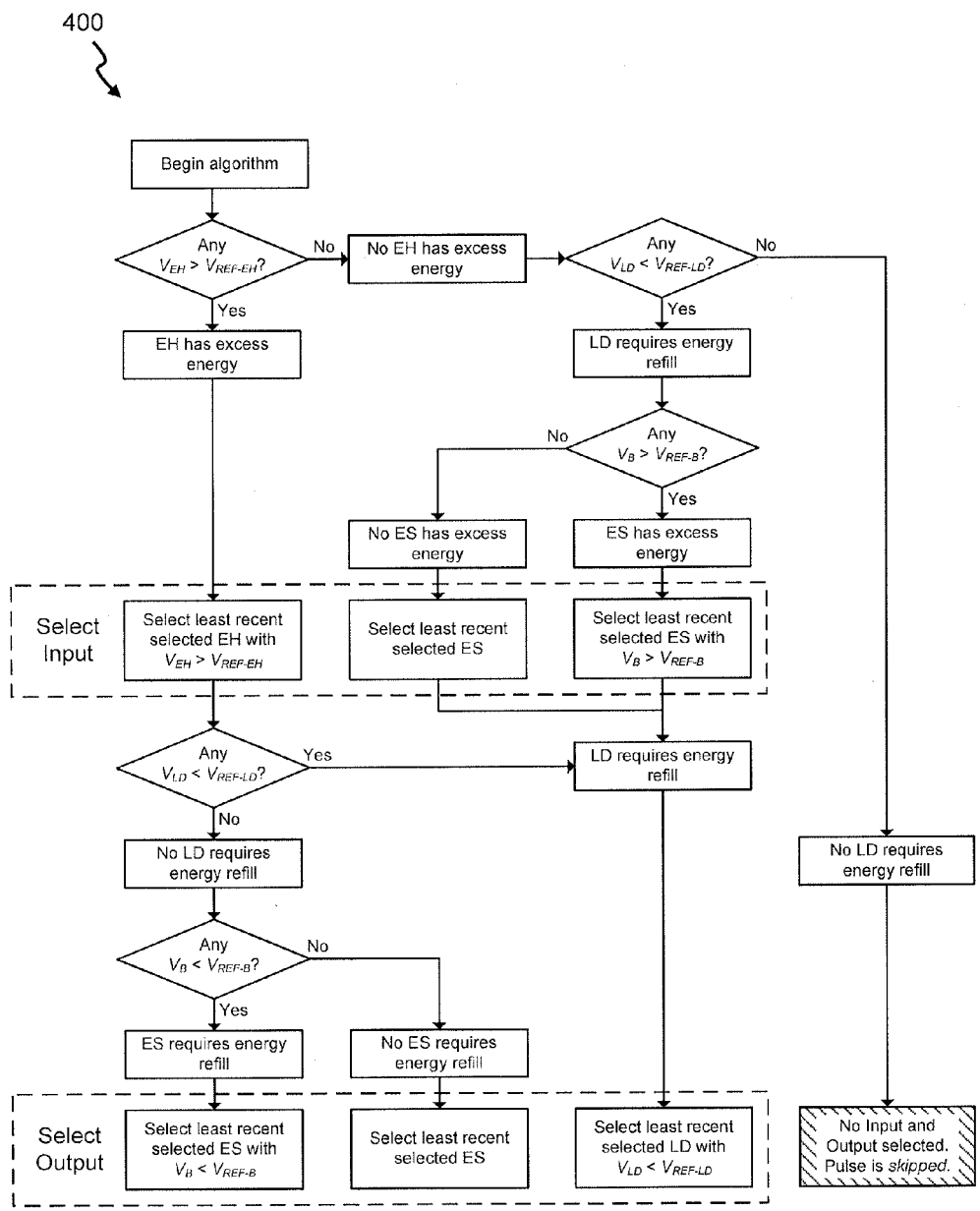
FIG. 4 is a flow diagram of a method performed by the controller of FIG. 2 for implementing Pulse-Skipping Modulation (PSM)

Specifically, the IN-OUT Selector 208 determines a source and load pair to be selected for voltage regulation based on the voltage comparison results (as provided by the $CMP_{OUT}$ signals 220) using a method 400 shown in FIG. 4, and a corresponding switch pair 102a, 102b, 104 (respectively coupled to the selected source and load pair) then needs to be activated in a current switching cycle. In a switching cycle, there is defined a switching pulse where a switching operation is invoked. The switching operation involves sequentially activating and deactivating afore said corresponding switch pair 102a, 102b, 104 coupled to the selected source and load pair to enable transfer of electrical energy therebetween (i.e. be electrically connected). The method 400 is devised for performing Pulse-Skipping Modulation (PSM), and is depicted in the flow diagram of FIG. 4. Also, the method 400 is implemented in hardware using a suitable combination of logic gates and flip-flops.

According to the method 400 of FIG. 4, energy harvesting devices 108 and voltage regulatable devices 110 are defined as a preferred source and load pair to be selected (which corresponds to an associated switch pair 102a, 102b, 104), if the necessary conditions are satisfied (i.e. $V_{EH}>V_{REF-EH}$ and $V_{LD}<V_{REF-LD}$). But if none of the energy harvesting devices 108 has excess electrical energy (which is reflected in a condition of $V_{EH}<V_{REF-EH}$), the method 400 routes to determine if there are energy storage devices 106 with excess electrical energy (which is reflected in another condition of $V_B>V_{REF-B}$). If it is found that there is at least one energy storage device 106 with excess electrical energy, the associated energy storage device 106 is then selected as the source. Similarly, if none of the voltage regulatable devices 110 is determined to require a refill of electrical energy (i.e. no fulfillment of condition: $V_{LD}<V_{REF-LD}$), a least recently selected energy storage device 106 that fulfills the condition of $V_B<V_{REF-B}$ is consequently selected as the load. In an event that no energy harvesting device 108 is determined to have excess electrical energy and none of the voltage regulatable devices 110 requires a refill, the method 400 determines no source and load pair is to be selected and the switching pulse is skipped to minimize switching power loss incurred by the controller 200. In the present context, the switching pulse is "skipped" means the switching operation is not initiated or activated.

Figure 3:
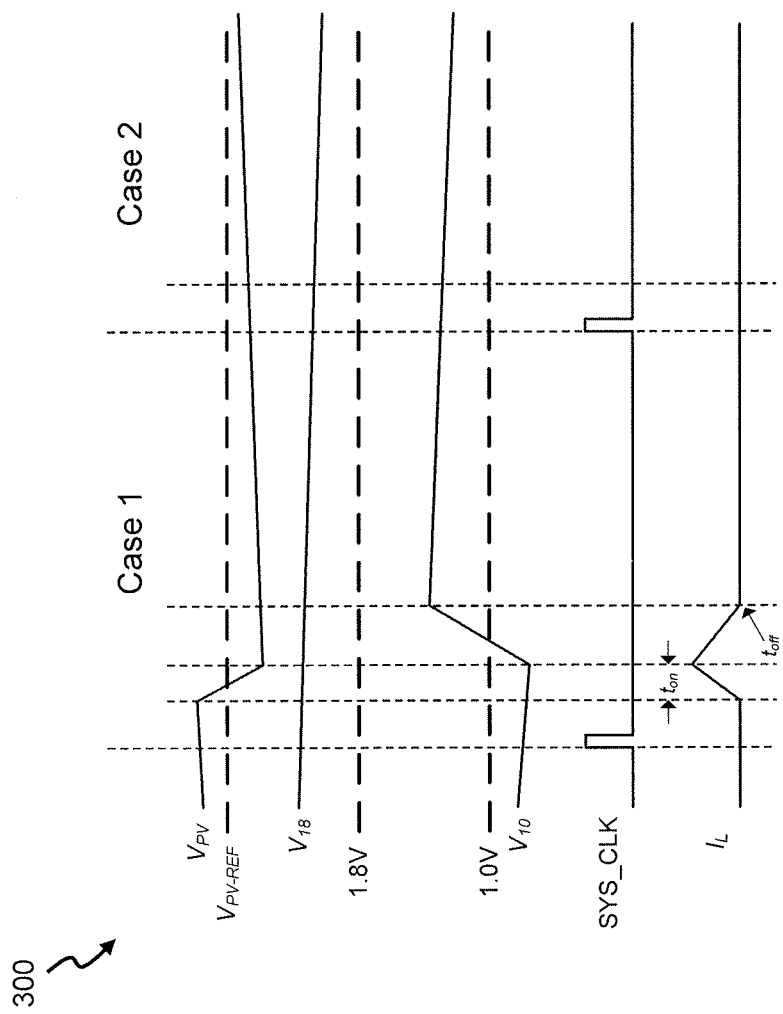
FIG. 3 shows a plot of voltage waveforms of the controller of FIG. 2.

Now referring to an (example) plot 300 of FIG. 3, in a plot section labeled under "Case 1", since $V_{PV}$ and $V_{10}$ (which represent voltages of a PV cell and a load) are respectively above and below the reference voltages (i.e. $V_{PV-REF}$ and 1.0 V) being compared against, $V_{PV}$ thus possesses excess electrical energy while $V_{10}$ requires a refill of electrical energy. $V_{18}$ does not need a refill since it is determined to be above the related reference voltage being compared to. So, in the present switching cycle, electrical energy is thus transferred from the PV cell to the load with voltage of $V_{10}$. When all voltages are determined to be within the respective reference voltages (i.e. see another plot section labeled under "Case 2" in FIG. 3), the switching pulse is "skipped", and so effectively the switching operation is not initiated to reduce switching power loss, i.e. Pulse-Skipping Modulation (PSM). In this instance, it can clearly be seen from FIG. 3 that $V_{PV}$ is below but close to its reference voltage, $V_{PV-REF}$, while the loads $V_{10}$ and $V_{18}$ are both above the respective reference voltages of 1.0 V and 1.8 V.

Although consumption of switching power by Gate Drivers 210 and associated switches 102a, 102b, 104 of the DC-DC converter 100 are avoided when the switching pulse is "skipped", power is nonetheless still consumed by the controller 200 when determining the voltage comparison results. It is to be appreciated that when the switching pulse is "skipped", the Gate drivers 210 and no switches in any of the set of switches 102a, 102b, 103, 104 are activated as a result of the skipping. That is, no output signal is transmitted by the IN-OUT Selector 208 to the Gate drivers 210 when the switching pulse is to be "skipped". Specifically, the Bandgap Reference 204 and Voltage Comparator 206 still consume power. So to further minimize power consumption, the controller 200 is configured to perform voltage comparison only when necessary. For example, when a level of harvested energy is low for a PV cell (such as during low lighting conditions), and when loading is low (where voltage variation is consequently slow), voltage comparison can thus be performed less frequently compared to a situation when either a level of the harvested energy or loading is high.

It is also to be appreciated that as power consumption varies several orders in a remote sensor, using Pulse-Skipping Modulation (PSM) alone is inefficient since generating a constant frequency of the SYS_CLK clock signal 214 will either cause too much power consumption for the voltage comparison (when not necessary), or too slow to response to a high loading condition. In view of this, Pulse-Frequency Modulation (PFM) is also implemented in the controller 200 to vary a frequency of generating and providing the SYS_CLK clock signal 214, based on detected conditions for the sources and loads. In contrast to conventional solutions [7], [8] which require an analog comparator to compare the output voltage (i.e. $V_{OUT}$) with a reference voltage (i.e. $V_{REF}$), the proposed controller 200 uses a method 500 for the Pulse-Frequency Modulation (PFM) by utilizing the voltage comparison results obtained from the Voltage Comparator 206 to determine whether a switching frequency of the subsequent switching cycle is to be increased (e.g. doubled) or decreased (e.g. halved).

It is to be further appreciated that the SYS_CLK Generator 202 of the controller 200 determines a frequency of the SYS_CLK clock signal 214 to be generated and hence consequentially determines when PFM is to be performed. The determination on when PFM is to be carried out depends on the said method 500, which is utilised for the operation of the frequency controller 2028 (to be elaborated further below).

Figure 5:
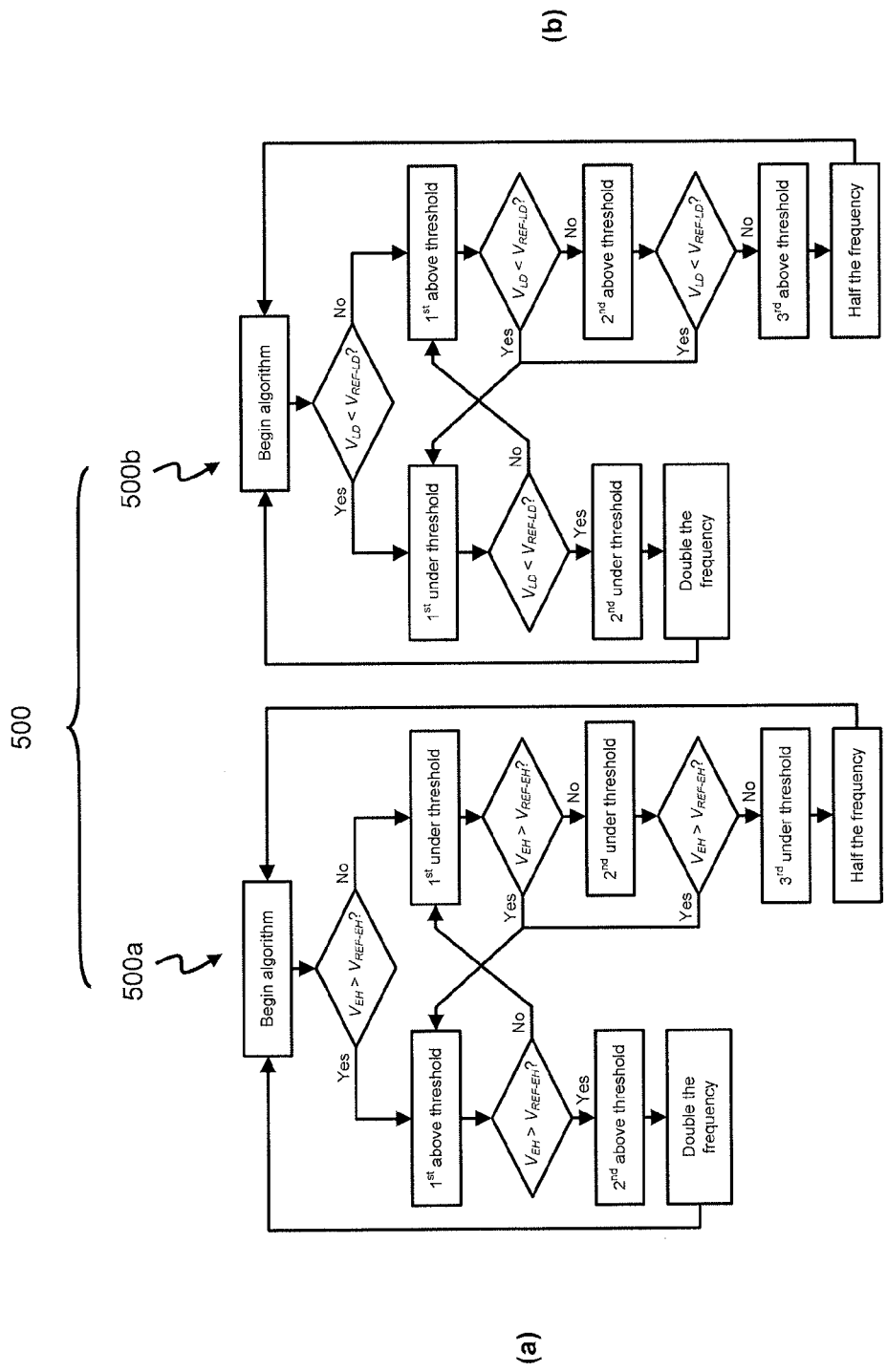
FIG. 5 includes FIGS. 5a and 5b, which show flow diagrams of a method performed by the controller of FIG. 2 for implementing Pulse-Frequency Modulation (PFM) with respect to a source and a load respectively.

FIGS. 5a and 5b show respective flow diagrams of the said method 500 for the Pulse-Frequency Modulation (PFM). In particular, the method 500 is further divided into two sub methods 500a, 500b, being respectively used for a source and a load. For both the sub methods 500a, 500b, the switching frequency is increased (e.g. doubled) if it is consecutively determined that the DC-DC converter 100 is experiencing a high source contribution or a high loading condition. In the context of the preceding sentence, it is clarified that "consecutively determined" means determined for a predetermined number of times (i.e. two times in this instance) before a response action is performed. The response action is to increase the frequency in this case. The respective conditions to be fulfilled under sub methods 500a, 500b in order for the switching frequency to be increased are: $V_{EH}>V_{REF-EH}$ and $V_{LD}<V_{REF-LD}$, and is consecutively determined as such. These conditions hold true if the source and load voltages are continuously above and below the respective associated threshold voltages. Hence, the switching frequency is (for example) doubled to increase a rate at which electrical energy is drawn from the source and transferred to the load.

It is to be appreciated that the sub methods 500a, 500b are performed for every source and load. While a same source and load may not be selected in a next switching cycle, the voltages of all sources and loads are nonetheless still compared to their corresponding reference voltages in every switching cycle. When there are multiple sources or loads, a source/load tracker is configured to skip several numbers of the comparison results. A number to skip is defined to be the number of the sources or loads minus one. For example, if there is only one source and one load, every comparison result is to be used by the load tracker. If there are one source and two loads, the load tracker of each load is arranged to only register every second comparison result, while the source tracker uses every comparison result. On the other hand, if there are two sources and two loads, the load and source tracker of each load and source register every second comparison results. As a rule, if there are "m" number of sources and "n" number of loads, the source tracker of each source registers the result of every $m^{th}$ comparison and the load tracker of each load registers the result of every $n^{th}$ comparison. The registered comparison results are then used as respective inputs during performance of the sub methods 500a, 500b to determine if the switching frequency is to be increased or decreased.

Conversely, when the DC-DC converter 100 is experiencing a low source contribution or a low loading condition, the source and load voltages will be consecutively determined to be below and above the respective threshold voltages. As before, the definition of "consecutively determined" in the immediate preceding sentence is the same as in the preceding paragraph, but the predetermined number of times before a response action is performed is now specified as three times. Also in this instance, the response action changes to decrease the switching frequency. In such a condition, the switching frequency is (for example) halved to reduce the power consumption of the controller 200.

It is to be appreciated that for multiple sources and loads, each source and load is independently tracked. In other words, every source and load is arranged with respectively tracking counters, and all sources and loads are subjected to the sub methods 500a, 500b of FIGS. 5a and 5b. The switching frequency is increased when any source or load is determined to be in a condition (as explained above) requiring the switching frequency to be increased. Conversely, the switching frequency is decreased only when it is determined that all of the sources and loads are in conditions that enable a decrease of the switching frequency to be acceptable. In other words, a frequency which the SYS_CLK clock signal 214 is provided is variable (and thereby influencing the switching frequency) in order to further reduce power consumption of the controller 200.

SYS_CLK Generator and Dual Threshold CMOS Relaxation Oscillator

As explained, the SYS_CLK Generator 202 generates the SYS_CLK clock signal 214. With reference to FIG. 2, the SYS_CLK Generator 202 includes the following modules/components: a Dual Threshold CMOS Relaxation Oscillator 2022, a frequency doubler 2024 (i.e. labeled as "2X_CLK"), an n-bit counter 2026, a frequency controller 2028 (i.e. labeled as "FREQ_SEL"), and a clock signal multiplexer 20210. It is to be appreciated that the frequency controller 2028 is configured to be operated based on the said method 500 for performing the Pulse-Frequency Modulation (PFM), which obtains necessary information from all available sources and loads for making a comparison to determine an appropriate frequency to select. The Dual Threshold CMOS Relaxation Oscillator 2022 is configured to generate a main clock signal 226 (i.e. labeled as "CLK") for the controller 200, the frequency doubler 2024 is arranged to derive a clock signal with twice the frequency of the main clock signal 226, and the n-bit counter 2026 is configured to derive the slower octaves of the main clock signal 226 (required for Pulse-Frequency Modulation (PFM)). An example of a frequency of the main clock signal 226 is 10 kHz, and thus the clock signal derived by the frequency doubler 2024 is 20 kHz. The frequency controller 2028 is arranged to implement the Pulse-Frequency Modulation (PFM) according to the sub methods 500a, 500b of FIGS. 5a and 5b for determining an appropriate frequency for the SYS_CLK clock signal 214 to be generated.

As the SYS_CLK Generator 202 is not configured to enter a sleep mode (i.e. deactivated) after the switching operation is completed, it is therefore important to also minimize the power consumed by the SYS_CLK Generator 202 to improve the power efficiency of the controller 200. In this aspect, to configure the SYS_CLK Generator 202 to consume minimal power, the type of circuit design adopted for the Dual Threshold CMOS Relaxation Oscillator 2022 (being the only analog component in the SYS_CLK Generator 202) is important. It is to be appreciated that the remaining modules/components 2024-20210 in the SYS_CLK Generator 202 are implemented using digital logic circuits.

Conventionally, a relaxation oscillator (e.g. see [4]) is implemented using two analog comparators, which consume a substantial amount of static DC power. However, use of the analog comparators is avoidable when inverters are instead adopted for the relaxation oscillator, and a threshold voltage of an inverter is then used as the reference voltage of the relaxation oscillator. Since a typical inverter has only one threshold voltage, but two reference voltages are however required in a relaxation oscillator so that a delay can be generated by charging and discharging a capacitor coupled to the relaxation oscillator, a dynamic threshold inverter (i.e. "DT_INV") is then implemented (for the Dual Threshold CMOS Relaxation Oscillator 2022) using the dual threshold CMOS technique which is available under advanced CMOS process.

The threshold voltage of an inverter depends on the transconductance of the PMOS and NMOS transistors used to implement the inverter. So, the dynamic threshold inverter is arranged to dynamically vary the transconductance of the associated PMOS and NMOS transistors by switching between a high $V_{TH}$ MOSFET and a low $V_{TH}$ MOSFET. Specifically, when a low threshold voltage inverter is required, the dynamic threshold inverter is configured with a high $V_{TH}$ PMOS and a low $V_{TH}$ NMOS. Conversely, when a high threshold voltage inverter is required, a low $V_{TH}$ PMOS and a high $V_{TH}$ NMOS are configured to be used by the dynamic threshold inverter.

Figure 6:
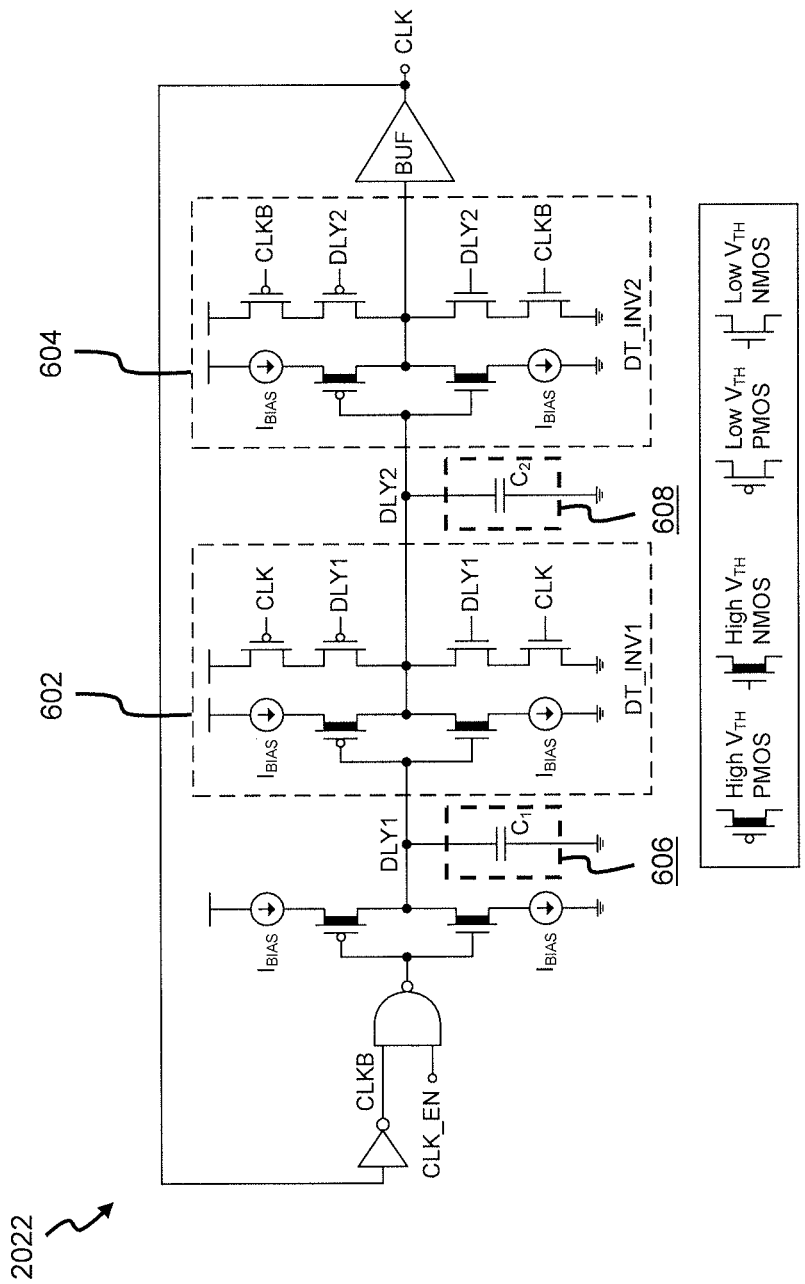
FIG. 6 shows the schematic of a Dual Threshold CMOS Relaxation Oscillator used in the controller of FIG. 2.

With reference to FIG. 6, the schematic diagram of the Dual Threshold CMOS Relaxation Oscillator 2022 adopting first and second dynamic threshold inverters 602, 604 (i.e. labeled respectively as "DT_INV1" and "DT_INV2") is shown. Delay is generated by both charging and discharging first and second capacitors 606, 608 (i.e. labeled respectively as "$C_1$" and "$C_2$") respectively coupled to each of the dynamic threshold inverters 602, 604 with a biasing current, $I_{BIAS}$. It is to be appreciated that the first and second capacitors 606, 608 are used so that each half of the clock period requires both a charging and a discharging event. As a result, a duty cycle of the main clock signal 226 can be maintained at 50%, even if the high and low threshold voltages of the dynamic threshold inverter are not equidistant from the mid voltage. As shown in FIG. 6, the low $V_{TH}$ PMOS and low $V_{TH}$ NMOS of the first dynamic threshold inverter 602 are controlled by the main clock signal 226 (i.e. "CLK"), whereas the low $V_{TH}$ NMOS and PMOS of the second dynamic threshold inverter 604 are instead controlled by a signal labeled as "CLKB" (shown in FIG. 6), which is derived from the main clock signal 226. This arrangement allows the threshold voltage of the first and second dynamic threshold inverters 602, 604 (i.e. DT_INV1 and DT_INV2) to vary according to the charging and discharging of the two associated capacitors (i.e. $C_1$ and $C_2$).

Figure 7A:
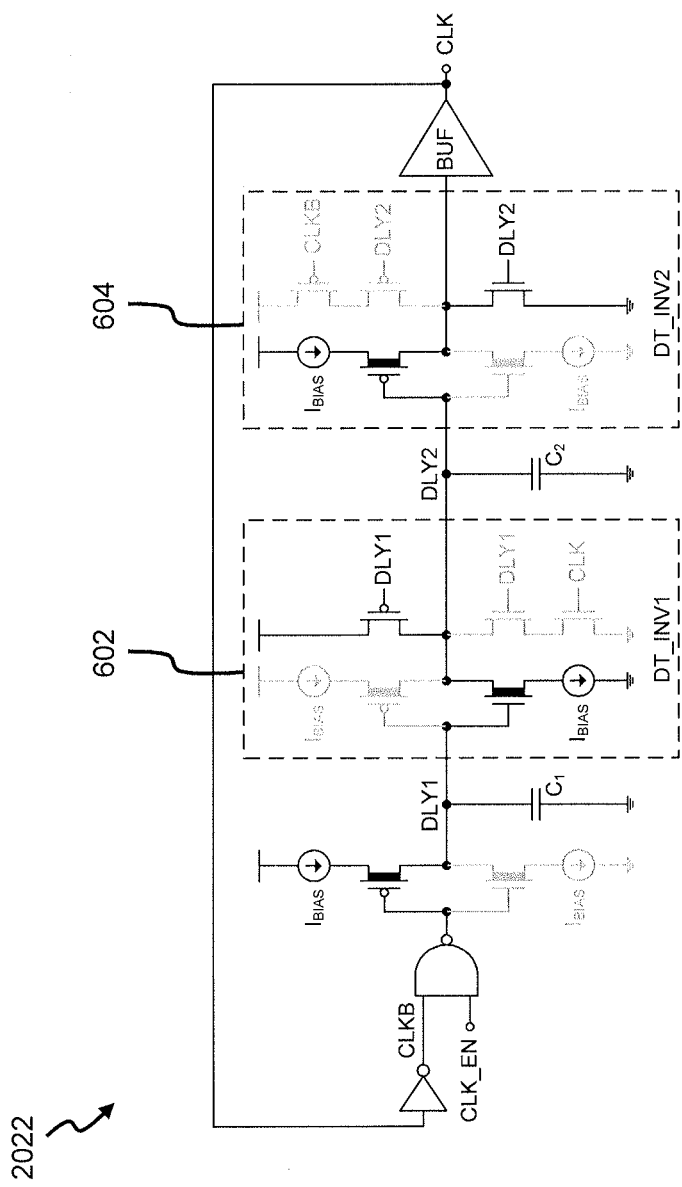
FIG. 7a shows the schematic of active components in the Dual Threshold CMOS Relaxation Oscillator of FIG. 6, when a CLK signal is at low.
Figure 7B:
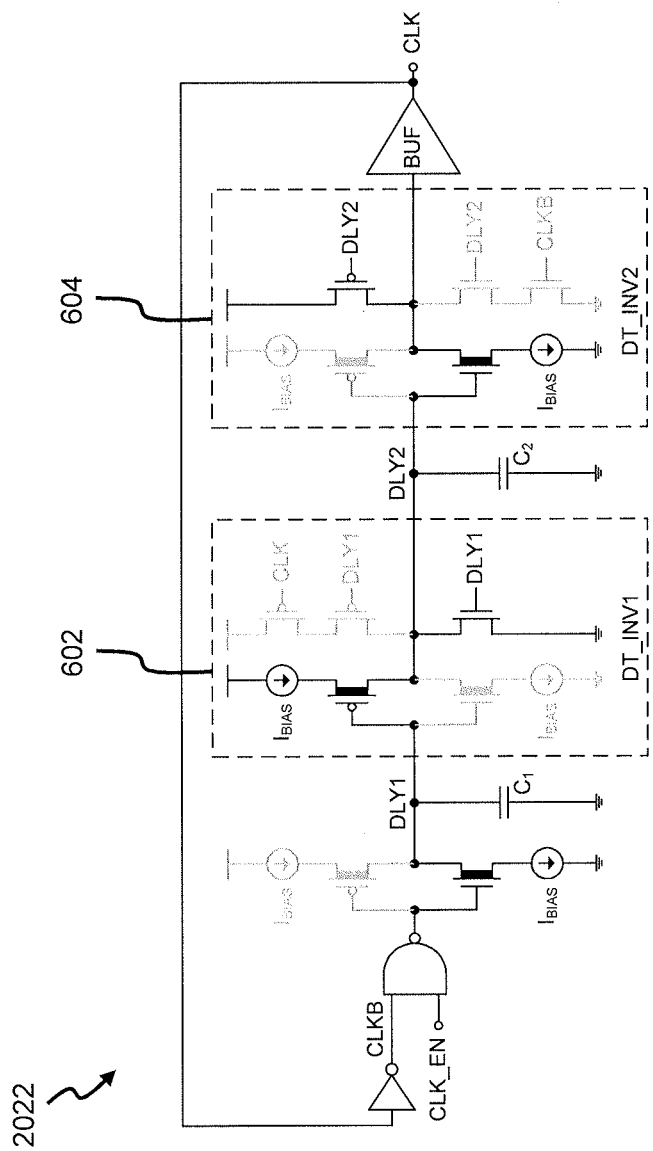
FIG. 7b shows the schematic of active components in the Dual Threshold CMOS Relaxation Oscillator of FIG. 6, when a CLK signal is at high.
Figure 8:
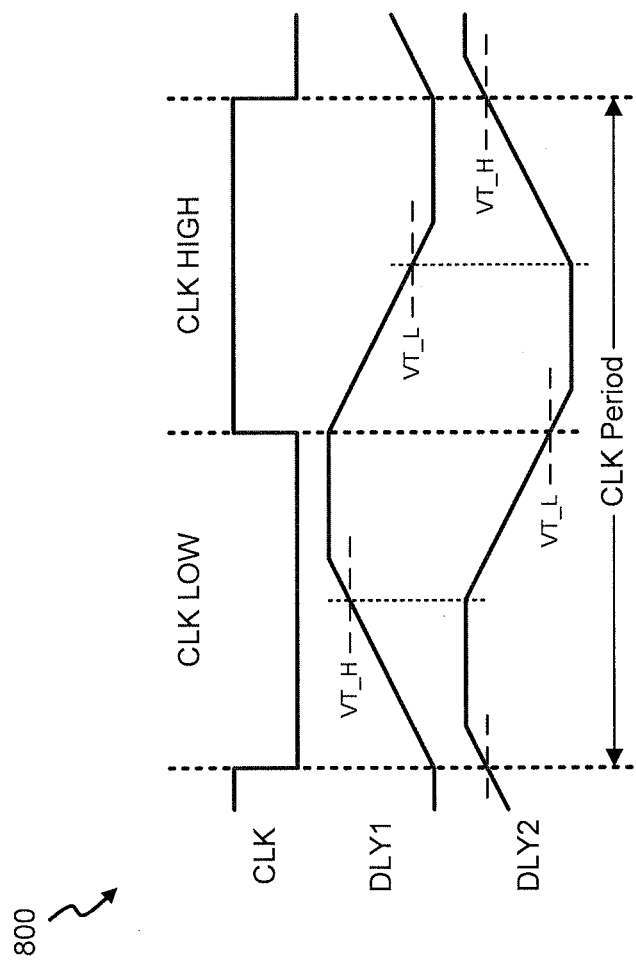
FIG. 8 shows a plot of signal waveforms of the Dual Threshold CMOS Relaxation Oscillator of FIG. 6.

FIGS. 7a and 7b shows respective schematic diagrams of the active components in the Dual Threshold CMOS Relaxation Oscillator 2022, when the main clock signal 226 is at low and at high. The inactive components are shown as faded outlines in FIGS. 7a and 7b. With reference also to FIG. 8, which shows a plot 800 of signal waveforms of the Dual Threshold CMOS Relaxation Oscillator 2022, when the main clock signal 226 is at low (i.e. see section labeled as "CLK LOW" in FIG. 8), a first voltage DLY1 rises as the first capacitor (i.e. $C_1$) is charged by the biasing current, $I_{BIAS}$. Specifically, the first voltage DLY1 is a voltage level across the first capacitor, $C_1$. To maximize duration of the delay generated, the threshold voltage of the first dynamic threshold inverter 602 (i.e. DT_INV1) is arranged to be at high (i.e. a level indicated by "VT_H" in FIG. 8 under the row for the first voltage "DLY1"). As such, the first dynamic threshold inverter 602 is configured with a low $V_{TH}$ PMOS and a high $V_{TH}$ NMOS to achieve a high threshold voltage.

When the first voltage DLY1 becomes smaller than the "VT_H" level (i.e. DLY1>VT_H), a second voltage DLY2 drops progressively as the second capacitor (i.e. $C_2$) is discharged by the biasing current, $I_{BIAS}$. Specifically, the second voltage DLY2 is a voltage level across the second capacitor, $C_2$. In order to maximize the duration of the delay obtained from discharging the second capacitor (i.e. $C_2$) the threshold voltage of the second dynamic threshold inverter 604 (i.e. DT_INV2) is arranged to be at low (i.e. a level indicated by "VT_L" in FIG. 8 under the row for the second voltage "DLY2"), and hence the second dynamic threshold inverter 604 is configured with a high $V_{TH}$ PMOS and a low $V_{TH}$ NMOS. When DLY2 becomes smaller than the "VT_L" level (i.e. DLY2<VT_L), the main clock signal 226 then rises to high after several buffer stages that minimizes shoot-through current. When the main clock signal 226 is at high (i.e. see section labeled as "CLK HIGH" in FIG. 8), the first and second capacitors (i.e. $C_1$ and $C_2$) are discharged and charged respectively. As such, the Dual Threshold CMOS Relaxation Oscillator 2022 is configured as shown in FIG. 7b so that the first voltage DLY1 is now arranged to be at the "VT_L" level and the second voltage DLY2 is at the "VT_H" level. Hence, by toggling between the levels "VT_L" and "VT_H", the Dual Threshold CMOS Relaxation Oscillator 2022 does not require use of any analog comparators, and thus consumes very low power.

Voltage Comparator

The Voltage Comparator 206 includes the following modules/components (i.e. see FIG. 2): the memory device 2064, a Capacitive Digital-to-Analog Converter (CDAC) 2066, an internal asynchronous clock generator 2068 (i.e. labeled as "CMP_CLK"), a dynamic comparator 20610 (i.e. labeled as "CMP"), a voltage multiplexer 20612 (i.e. labeled as "Voltage MUX") and a digital reference multiplexer 20614 (i.e. labeled as "Digital Reference MUX"). The internal asynchronous clock generator 2068 is configured to generate clock pulses 227 (i.e. labeled as "C_CLK") required by the dynamic comparator 20610 and the CDAC 2066, and the memory device 2064 is configured to store digital codes corresponding to the second set of reference voltages, whereas the CDAC 2066 is arranged to convert all the digital codes (provided by the memory device 2064, as well as the MPPTs 2062) into corresponding analog voltages.

It is to be appreciated that to minimize power consumption of the CDAC 2066, a successive approximation technique is utilized, in which the $V_{BG}$ signal 216 is used as the main reference voltage for the CDAC 2066. By using an accurate reference voltage, the CDAC 2066 thus is able to accurately generate other threshold voltages required by the dynamic comparator 20610. To save silicon area for implementing the Voltage Comparator 206, a single dynamic comparator 20610 is used to compare multiple voltages (i.e. $V_{EH}$, $V_B$ and $V_{LD}$). On the other hand, the clock pulses 227 (i.e. "C_CLK") are required to synchronize the comparison sequence so that the voltages and thresholds can be sequentially provided to the dynamic comparator 20610.

As earlier described, the MPPTs 2062 stores digital codes corresponding to the first set of reference voltages to ensure all the energy harvesting devices 108 operate at respective MPPs. Particularly, all the MPPTs 2062 implement the Perturb and Observe MPPT algorithm. Using the PV cell as an example, an associated MPPT 2062 adjusts the corresponding reference voltage setting of $V_{PV}$, (i.e. $V_{PV\text{-}REF}$) at the CDAC 2066. If indoor lighting conditions are not expected to change rapidly, the MPPT algorithm of the MPPT 2062 for the PV cell can be implemented with intervals of 3.3 seconds to minimize its power consumption. On the other hand, the dynamic comparator 20610 is arranged to compare the voltage levels of the electrical devices 106, 108, 110 against the first and second sets of reference voltages to obtain voltage comparison results to subsequently provide the $CMP_{OUT}$ signals 220. In this embodiment, the voltage multiplexer 20612 and digital reference multiplexer 20614 are adopted so that only one CDAC 2066 and dynamic comparator 20610 are required, which beneficially reduces an implemented chip size of the controller 200 (i.e. the required silicon area can be reduced).

The Voltage Comparator 206 operates as follows: the asynchronous clock generator 2068 is activated by the $V_{BG\_RDY}$ signal 218 transmitted by the Bandgap Reference 204. Once activated, the asynchronous clock generator 2068 generates multiple clock pulses (i.e. labeled as "C_CLK" in FIG. 2) to cycle through the readouts of the voltage multiplexer 20612 and digital reference multiplexer 20614 so that all the voltage levels (i.e. $V_{EH1\text{-}n}$, $V_{LD1\text{-}n}$ and $V_{B1\text{-}n}$) of the electrical devices 106, 108, 110 are compared against the respective reference voltages. Individual voltage comparison result is transmitted (as an associated $CMP_{OUT}$ signal 220) to the IN-OUT Selector 208 for determining a source and load pair (which in turn corresponds to a switch pair 102a, 102b, 104 to be activated in the present switching cycle) to be selected. Synchronization between the Voltage Comparator 206 and IN-OUT Selector 208 is attained using a CMP_RDY signal 228 transmitted by the asynchronous clock generator 2068.

A size of the bits resolution of the CDAC 2066 represents a trade-off between accuracy, power consumption and silicon area. Although a larger bits resolution value provides higher accuracy, it also requires a larger capacitor area and capacitance, which undesirably increases the dynamic power consumption of the CDAC 2066 and the silicon area required for chip implementation. For this embodiment, the CDAC has a resolution of 8-bits, which is considered sufficient for the purpose of intended application, as higher accuracy is unnecessary due to the inherent voltage ripples of the DC-DC converter 100.

Figure 9:
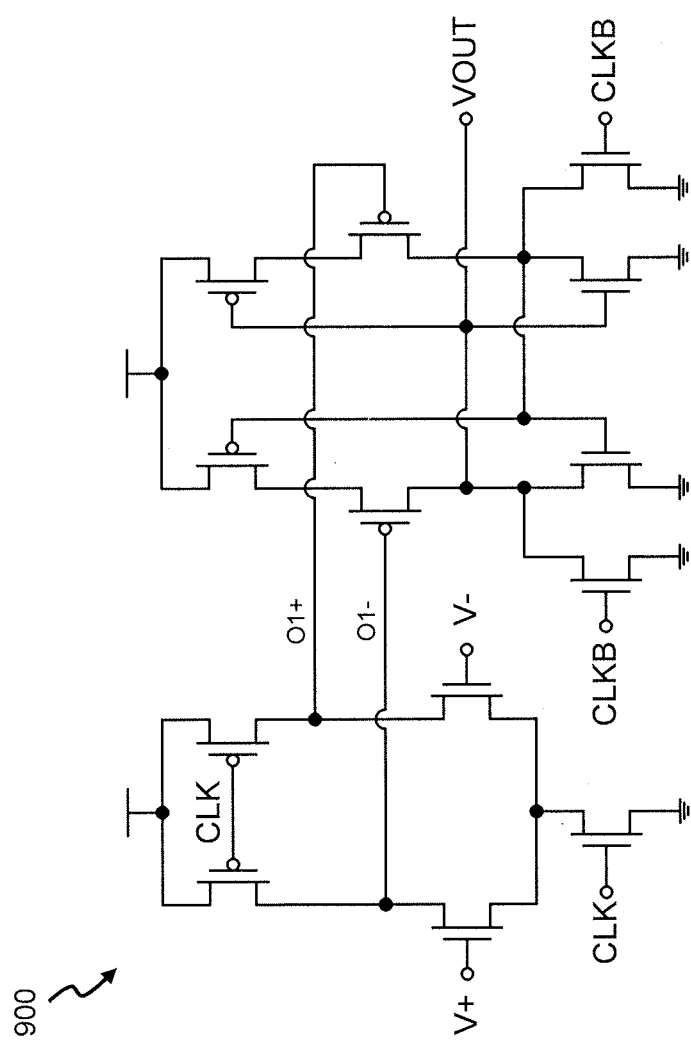
FIG. 9 shows the schematic of a Double-Tail Latch-Type Dynamic Comparator used in the controller of FIG. 2.

The dynamic comparator 20610 is implemented as a Double-Tail Latch-Type Dynamic Comparator [9] [10], as shown in a schematic diagram 900 of FIG. 9. This is because the dynamic comparator 20610 does not consume quiescent power, unlike an analog comparator, which requires static DC power. Thus, advantageously, the dynamic comparator 20610 does not consume further power once the voltage comparison is completed.

It is to be appreciated that the dynamic comparator 20610 can also be implemented using other types of comparators, besides the Double-Tail Latch-Type Dynamic Comparator, so long the quiescent power of the dynamic comparator 20610 can be reduced to zero whenever the dynamic comparator 20610 is not required for operation.

Operation Overview of the Controller

The controller 200 is activated on generation of the SYS_CLK clock signal 214 to initiate a new switching cycle. But prior to receipt of the SYS_CLK clock signal 214, all modules/components of the controller 200 are deactivated to minimize quiescent power consumption, except for the SYS_CLK Generator 202. Once the Bandgap Reference 204 detects receipt of the SYS_CLK clock signal 214, the Bandgap Reference 204 is activated to generate and transmit the $V_{BG}$ 216 signal to the Voltage Comparator 206. Specifically, the $V_{BG}$ signal 216 is received by the (8-bits) CDAC 2066 of the Voltage Comparator 206. After the $V_{BG}$ signal 216 has stabilized, the Voltage Comparator 206 is activated by the $V_{BG\_RDY}$ signal 218 (transmitted by the Bandgap Reference 204) to commence comparison of the voltage levels of the electrical devices 106, 108, 110 against respective reference voltages which are converted from the corresponding digital codes provided by the MPPTs 2062 and memory device 2064. The meaning of the $V_{BG}$ signal 216 has stabilized in this context is briefly explained as follows: when deactivated, the $V_{BG}$ signal 216 is not regulated and allowed to drift. When the Bandgap Reference 204 is activated, the $V_{BG}$ signal 216 is then regulated by the Bandgap Reference 204 to a predetermined fixed voltage. As with all analog regulators, a certain amount of settling time is required before the $V_{BG}$ signal 216 settles down to a required value. So in this context, "stabilized" means the $V_{BG}$ signal 216 has settled to the required value and will not change further, non-negligibly.

While the DC-DC converter 100 has multiple switch pairs 102a, 102b, 104, either no switch pairs, or only one switch pair 102a, 102b, 104 is to be activated during each switching cycle, based on the voltage comparison results, as explained above in the section: "Pulse-Skipping Modulation (PSM), Pulse-Frequency Modulation (PFM) and IN-OUT Selector". Accordingly, once a source and load pair is selected, the IN_SEL_and_OUT_SEL control signal 222 is transmitted by the IN-OUT Selector 208 to the Gate Drivers 210 for activating respective gate drivers of a switch pair 102a, 102b, 104 corresponding to the selected source and load pair. Thus, the IN_SEL_and_OUT_SEL control signal 218 contains information on a source and load pair selected by the IN-OUT Selector 208.

The DC-DC converter 100 also operates with a predetermined switched-on period, in which a switch pair 102a, 102b, 104 associated with the selected source and load pair is sequentially switched on and off. In particular, an input switch 102a, 102b associated to the selected source (i.e. an energy harvesting device 108 or an energy storage device 106) is to be switched on for the duration of $t_{ON}$ (e.g. 600 ns, but understood to be dependent on an intended application, and thus may not be limited to 600 ns) as defined in the $t_{ON}$ signal 224 (which is transmitted by the ON-time Control 212) to initially transfer the excess electrical energy to the inductor 105 for temporary storage, before being switched off. It is also to be appreciated that electrical energy can be transferred directly from the source to the load, without involving the inductor 105, only if the source and load voltages are approximately the same. But to clarify, in general when a DC-DC converter 100 is required, source and load voltages do not tend to match, and hence, an inductor is required to bridge the voltage differences. Once completed, an output switch 104 associated with the selected load is switched on so that the excess electrical energy stored in the inductor is transferred to the selected load, and the output switch 104 is switched off when the inductor current reduces to zero, at $t_{OFF}$, which can be detected using a Zero Current Detector (ZCD) unit (not shown in FIG. 2). An example of the voltage waveform of the scenario described above is shown under "Case 1" of FIG. 3. It is to be appreciated that unlike $t_{ON}$, which can be configured to a desired value, $t_{OFF}$ depends on a relationship between the voltages of an associated source and load, which is detected automatically by the DC-DC converter 100. For example, if a voltage of the load is approximately half of a voltage of the source, $t_{OFF}$ is then about 1.2 µs.

It is to be appreciated that although the duration of $t_{ON}$ is fixed for one switching cycle, the duration of $t_{ON}$ can however be configured differently for different switching cycles. That is, the $t_{ON}$ for a subsequent switching cycle can be different to the $t_{ON}$ of the previous/present switching cycle. The duration of $t_{ON}$ is determined by the ON-time Control 212, which is configured to vary $t_{ON}$ based on a source selected and an amount of electrical energy to be transferred to a load selected. After a switching cycle is completed, either at $t_{off}$ of "Case 1" of FIG. 3 or if no switch pair 102a, 102b, 104 is selected by the IN-OUT Selector 208 as per "Case 2" of FIG. 3, all analog components of the controller 200, except for the SYS_CLK Generator 202, are deactivated to substantially remove consumption of static DC power. The controller 200 then enters into a sleep mode, but is awakened on receipt of another SYS_CLK clock signal 214 to begin a next new switching cycle. If the controller 200 is configured to spend a relatively long time in the sleep mode, the associated power supplies of any digital modules/components of the controller 200 can be power gated to reduce power leakage and thus further reduce the power consumption of the controller 200. Since the proposed controller 200 consumes no DC power during the sleep mode, the power consumption of the controller 200 can thus be scaled down with the reduction of the switching frequency.

Further embodiments of the invention will be described hereinafter. For sake of brevity, description of like elements, functionalities and operations that are common between the embodiments are not repeated; reference will instead be made to similar parts of the relevant embodiment(s).

Figure 10:
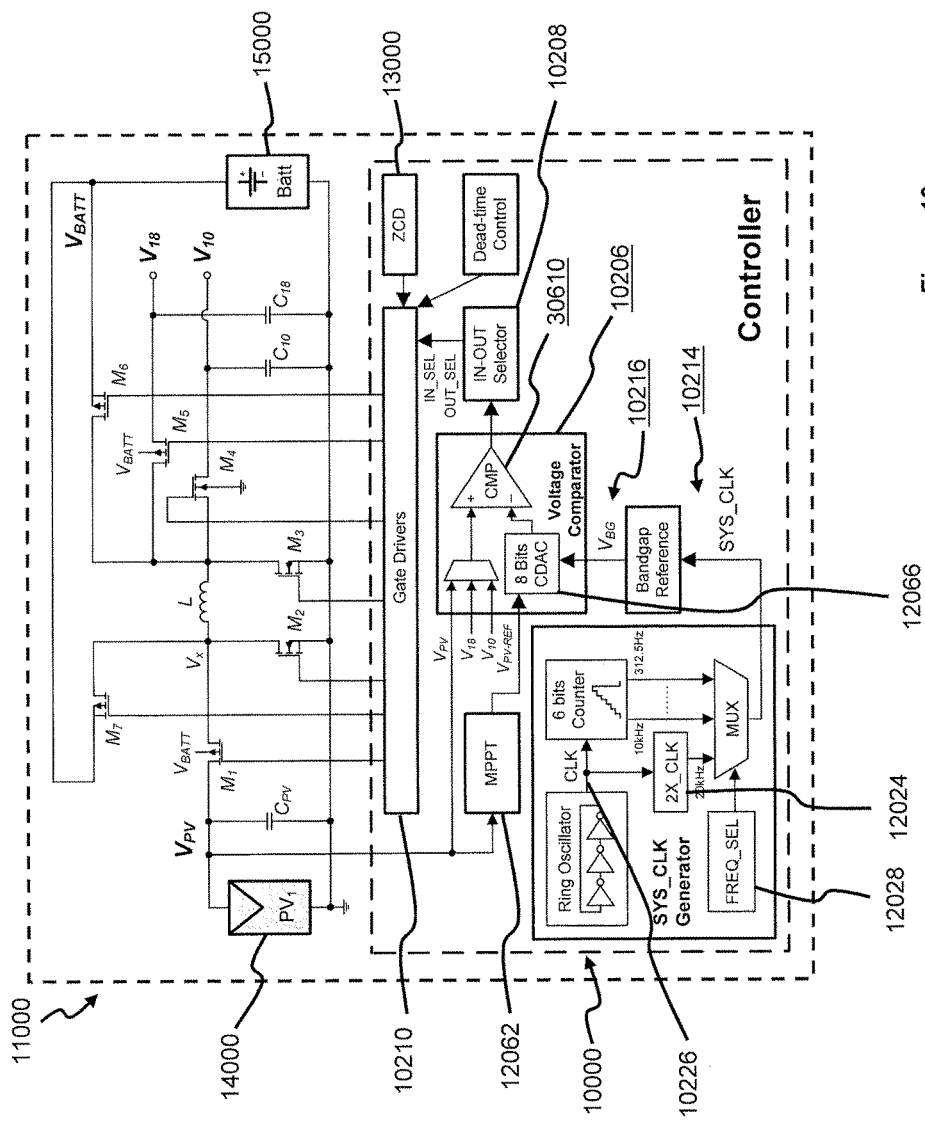
FIG. 10 shows the circuit architecture of a Single-Inductor Dual-Input-Tri-Output DC-DC (Buck-Boost) converter and a related controller, according to a second embodiment.

According to a second embodiment, there is proposed another variant controller 10000 as shown in FIG. 10, which is adapted for a Single-Inductor Dual-Input-Tri-Output DC-DC (Buck-Boost) converter 11000 (also shown in FIG. 10). The variant controller 10000 in this instance is largely similar to the controller 200 of FIG. 2, except for the following differences. It is highlighted that like components of the controller 10000 of FIG. 10 are labeled in the same manner as those in FIG. 2, but with 10000 added as the reference numeral. For the Voltage Comparator 10206 of the controller 10000 of FIG. 10, the memory device 2064 shown in FIG. 2 is omitted. Specifically, the memory device 2064 is omitted in this embodiment because the threshold voltages required by a DC-DC converter 11000 are known and hard-wired thereon. As programming of the digital references is not required, the memory device 2064 is thus omitted. Also, only one Maximum Power Point Tracker (MPPT) 12062 is used for this current embodiment, since only one energy harvesting device is connected (i.e. the PV cell 14000). It is however to be highlighted that the internal asynchronous clock generator 2068, and the digital reference multiplexer 20614 of FIG. 2 are not depicted in FIG. 10 due to space constraints. There is also shown in FIG. 10 a Zero Current Detector (ZCD) unit 13000 coupled to the Gate Drivers 10210. The ZCD unit 13000 in this embodiment serves the same function as the ZCD afore described in the first embodiment.

As explained, the controller 10000 of FIG. 10 is adapted for the converter 11000, which delivers energy harvested by the PV cell 14000 to the 1V supply (i.e. at node labeled as "$V_{10}$"), 1.8V supply (i.e. at node labeled as "$V_{18}$"), or a battery 15000 through one power conversion step. When the harvested energy is low, power required by the two supply rails is drawn from a battery 15000, which generates the second input of the DC-DC converter 11000. The DC-DC converter 11000 is arranged to operate in a Discontinuous Conduction Mode (DCM) and regulates the voltages $V_{PV}$, $V_{18}$ and $V_{10}$ using a combination of Pulse-Skipping Modulation (PSM) and Pulse-Frequency Modulation (PFM), with a constant switched on duration of $t_{ON}$. When lighting conditions are low and the remote sensor is idling, both the harvested power and load power are very low.

Thus, the power consumed by the controller 10000 needs to be reduced to remain energy efficient. This is achieved by configuring the controller 10000 (and thus the DC-DC converter 11000) to remain active only for a short period of time in the entire switching cycle by using Pulse-Skipping Modulation (PSM), which is the same as the first embodiment (and hence not repeated for brevity). Furthermore, the Pulse-Skipping Modulation (PSM) enables dynamic comparators to be employed instead of using error amplifiers and high-speed comparators, which have to be constantly switched on for Pulse-Width Modulation (PWM) and hysteretic control.

Figure 11:
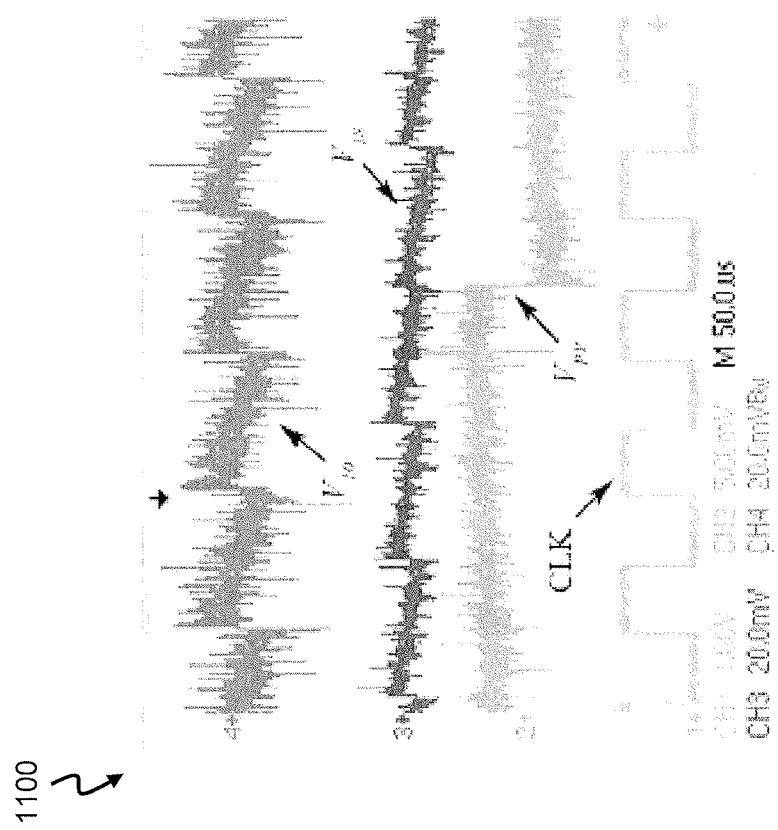
FIG. 11 is a diagram of measured waveform of the voltage ripples at nodes $V_{PV}$, $V_{18}$ and $V_{10}$ of the circuit of FIG. 10.

At the beginning of each switching cycle, the controller 10000 is awakened by the SYS_CLK clock signal 10214. After the $V_{BG}$ signal 10216 has stabilized, the dynamic comparator 30610 compares the voltages $V_{PV}$, $V_{18}$, $V_{BATT}$, and $V_{10}$ consecutively, with the respective reference voltages generated by the CDAC 12066, to determine if the voltages $V_{PV}$, $V_{18}$, $V_{BATT}$, and $V_{10}$ are within the respective ranges. It is to be appreciated that the MPPT 12062 only provides the digital reference voltage for the PV cell 14000. The comparison results are subsequently transmitted to the IN-OUT Selector 10208 to determine and select a source and load pair. This in turn determines an associated switch pair 102a, 102b, 104 to be activated in the current switching cycle. With reference to the same scenario in FIG. 3, measurement results 1100 in FIG. 11 illustrate that the voltage $V_{PV}$ is switched less frequently than the voltages $V_{10}$ and $V_{18}$, since $V_{PV}$ is arranged with a lower current, which consequently results in the reference voltage being crossed less frequent.

Figure 12:
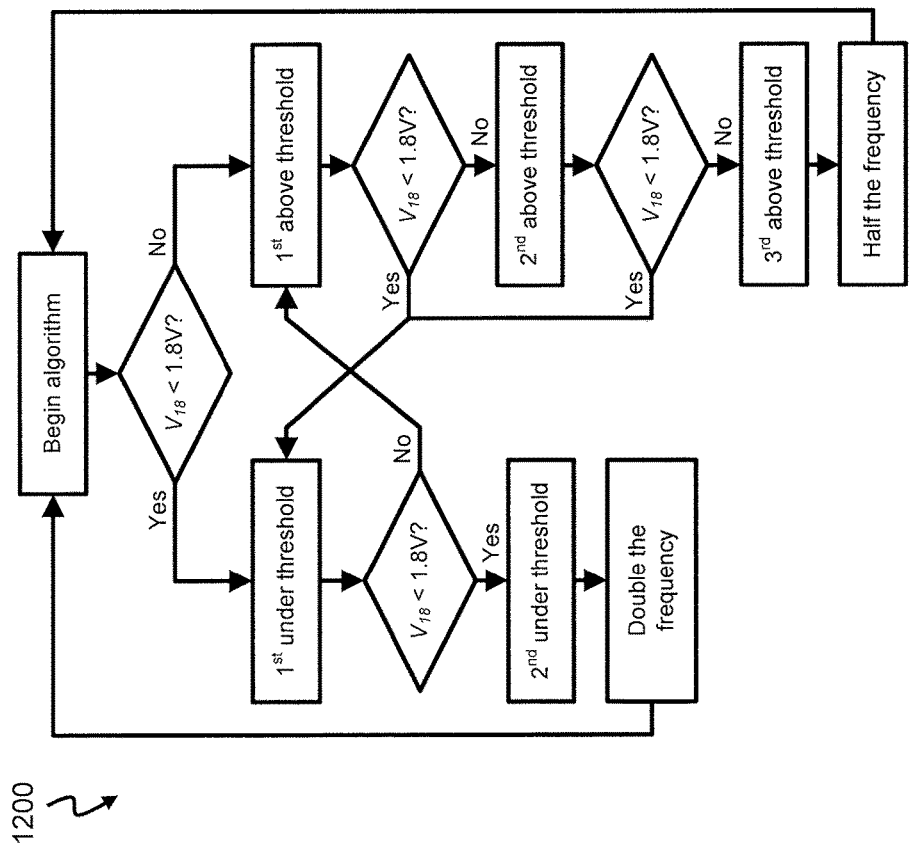
FIG. 12 is a flow diagram of a method for performing Pulse-Frequency Modulation (PFM), based on the second embodiment.

To cater for output power covering four orders of magnitude (i.e. 1 μW to 10 mW), Pulse-Frequency Modulation (PFM) similarly implemented as the method 500 (shown in FIGS. 5a and 5b) of the first embodiment is adopted. For this embodiment, the frequency for the main clock signal 10226 is 10 kHz. In this instance, to reduce power loss, the frequency doubler 12024 is enabled only when the DC-DC converter 11000 needs to operate at 20 kHz. As per the first embodiment, the frequency controller 12028 determines if the current SYS_CLK clock signal 10214 needs to be increased (e.g. doubled), or decreased (e.g. halved) based on the results of the voltage comparison. It is to be appreciated that the method 1200 in FIG. 12 is similar to the sub method 500b in FIG. 5b, except that $V_{18}$ and 1.8V respectively replace $V_{LD}$ and $V_{REF-LD}$ in FIG. 5b for FIG. 12.

Figure 13:
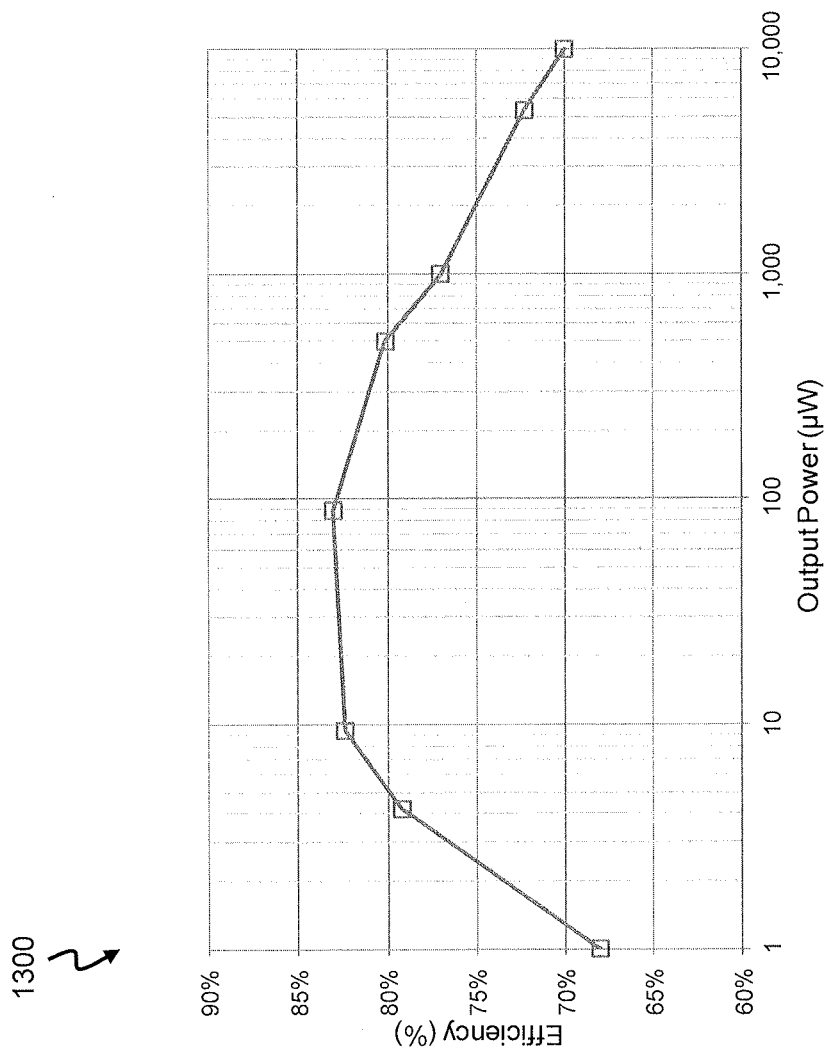
FIG. 13 is a plot of measured conversion efficiency under various output power for the DC-DC converter of FIG. 10.
Figure 14:
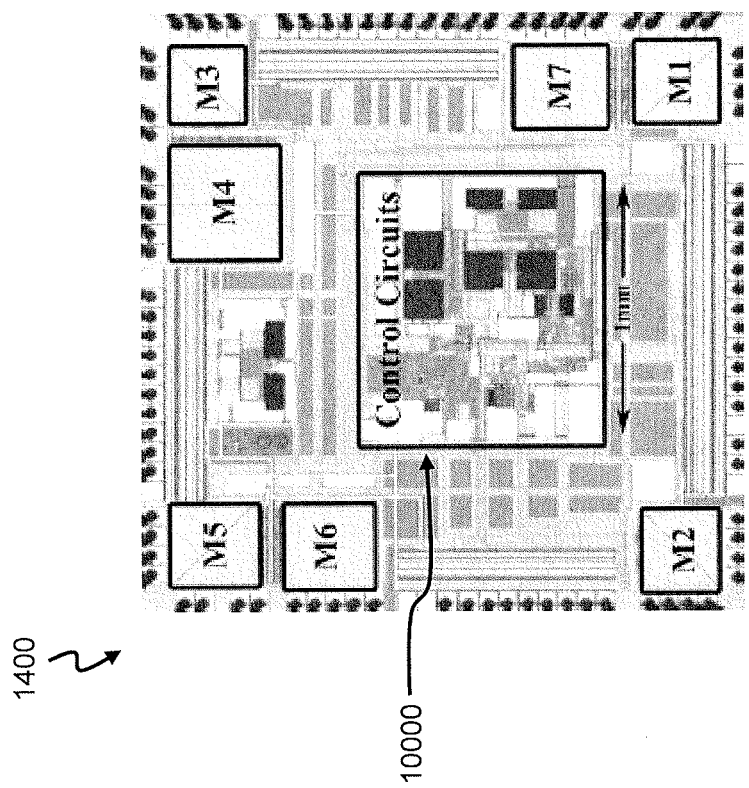
FIG. 14 is a micrograph of the DC-DC converter of FIG. 10, fabricated using a 0.18 μm CMOS process.

FIG. 14 is a micrograph 1400 of the DC-DC converter 11000 fabricated in a 0.18 μm CMOS process, and occupies a chip area of 2.15×2.15 mm². The measured quiescent power of the DC-DC converter 11000 is about 400 nW. Due to the low quiescent power, the DC-DC converter 11000 is able to achieve about 68% efficiency at an output of 1 μW. Due to the dynamic architecture of the DC-DC converter 11000, by further reducing a frequency at which the SYS_CLK clock signal 10214 is generated, lower quiescent power can be attained. The DC-DC converter 11000 exhibits a peak efficiency of 83% and maintains an efficiency of more than 65% from 1 μW to 10 mW, as seen from FIG. 13, which depicts a plot 1300 of measured conversion efficiency of the DC-DC converter 11000 under various output power. It is to be appreciated that a major cause for the degradation in conversion efficiency is the suboptimal Zero-Current Detector unit 13000, which results in a significant portion of the input power not being transferred to the output.

FIG. 15 is a table 1500 of comparison for conventional energy harvesters and the DC-DC converter 11000 of FIG. 10 (which uses the controller 10000). Among the state-of-art harvesters listed in the FIG. 15, it is seen that the DC-DC converter 11000 of FIG. 10 has the lowest power consumption for the associated controller 10000, being about 0.4 μW. Thus, the DC-DC converter 11000 of FIG. 10 is able to achieve the highest conversion efficiency at several microwatts of power. Although reference [2] listed in the table 1500 has higher peak efficiency (when the MPPT is excluded), the reference [2] requires another power converter to interface between the battery and the load. As a result, the expected overall peak conversion efficiency of the reference [2] is expected to be lower than the DC-DC converter 11000 of FIG. 10. Moreover, the DC-DC converter 11000 of FIG. 10 generates a 1.8V supply rail for the sensors and analog circuits, and a 1V supply rail for the digital logic blocks so that the performance and power consumption of the overall remote sensor can be optimized.

Commercial Applications

The concept of energy harvesting is gaining popularity for use in remote sensors, as it not only reduces the size of the battery required, but also eliminates need for battery replacement, thereby greatly reduces costs of deploying the remote sensors. Conventional remote sensors, for example the RHT03 humidity and temperature sensor by Sparkfun Electronics (i.e. www.sparkfun.com/products/10167), the SHT21 digital humidity sensor by Sensirion (i.e. www.sensirion.com/en/products/humidity-temperature/humidity-sensor-sht21/) and the EX-35R motion sensor by Optex (i.e. www.optexamerica.com/productpage.aspx?I1=1&I2=3&id=16), usually consume power in the range of microwatts to milliwatts. Therefore, power converters used for power management in those remote sensors can consume only at most microwatts of power to remain energy efficient.

In contrast, by using the proposed controller 200, 10000, the DC-DC converter 100, 11000 is capable of operating with sub-microwatts of power, and hence suitable for use in remote sensor applications. Furthermore, the DC-DC converter 100, 11000 is also sufficiently versatile for coupling to multiple energy sources (e.g. batteries, PV cells, thermal and piezoelectric energy harvesters, etc.) and multiple loads. With power consumption in the range of sub-microwatts, the DC-DC converter 100, 11000 can thus operate efficiently even when the energy harvesting devices 108 are harvesting only several microwatts of power, such as during low lighting conditions encountered by the PV cells. Comparing with a conventional power converter (e.g. [3]), under those situations, energy harvesting devices coupled to the conventional power converter need to be shut down, as the amount of harvested power is insufficient to power up the related power converter, thereby wasting precious energy that can otherwise be harvested. Hence, the DC-DC converter 100, 11000 which is configured with the proposed controller 200, 10000 is able to efficiently harvest energy under less favorable environmental conditions, which translates into more energy being harvested over time and results in a reduction in the costs of deploying remote sensors, since smaller energy harvesting devices 108 and energy storage devices 106 can beneficially be used.

Some conventional solutions are briefly described below to provide further comparison. Texas Instruments (TI) produces a range of products catered for energy harvesting, and one of them is the eZ430-RF2500-SEH Solar Energy Harvesting Development Kit (i.e. www.ti.com/tool/ez430-rf2500-seh), which uses a 2.25"×2.25" solar panel to run a wireless sensor application with no additional batteries. Based on a SANYO AM-1815 solar panel (i.e. www.msc-ge.com/download/sanyo/indoor/AM-1815.pdf), which has a similar size as the solar panel used in the TI development kit, the output power of the solar panel of TI's development kit is only approximately 150 µW. It is to be appreciated that since the TI development kit does not provide clear specifications on the power capabilities of its solar panel, comparison is therefore made with reference to the SANYO AM-1815 solar panel in order to gauge the power of the solar panel of the TI development kit. Furthermore, TI's said development kit provides additional inputs for external energy harvesters. If a multiple-input DC-DC converter, such as the DC-DC converter 100 that uses the proposed controller 200, is utilized, a number of converters configured within the TI's development kit can then be reduced. Also similar to TI, Microchip Technology Inc. has developed a development kit, which is the XLP 16-bit Energy Harvesting Development Kit (i.e. www.microchip.com/energyharvesting), for energy harvesting applications. The development kit features a nanowatt microcontroller unit and a high-efficiency solar panel.

Linear Technology Corporation (LTC) also develops energy harvesting products, but focuses more on individual function blocks, such as the LTC3108 Step-Up Converter (i.e. www.linear.com/product/LTC3108) and LTC3588-1 Piezoelectric Energy Harvesting Power Supply (i.e. www.linear.com/product/LTC3588-1). EnOcean (i.e. www.enocean.com/en/energy-harvesting/) develops energy harvesting modules (e.g. the STM 300 energy harvesting wireless sensor module) for wireless sensors. The energy harvesting modules are to be powered by energy harvesting sources with microwatt energy harvesters, such as the ECS 300 (i.e. www.enocean.com/en/enocean_modules/ecs-300/) solar cell.

Silicon Labs focuses development on low power wireless microcontrollers, such as the Si1010 Wireless Microcontroller (i.e. www.silabs.com/products/wireless/wirelessmcu/Pages/Si1010.aspx), which features lower active and sleep currents of 160 µA/MHz and 10 nA respectively.

To demonstrate capabilities of the low power wireless microcontrollers, Silicon Labs also developed an Energy Harvesting Reference Design (i.e. www.silabs.com/products/mcu/Pages/ENERGY-HARVEST-RD.aspx), which comprises a wireless sensor node incorporating the related microcontroller powered by a small solar array. An energy harvesting supply powering the microcontroller of the wireless sensor node consumes approximately 3 µA.

Maxim Integrated has developed an Energy-Harvesting Charger and Protector (MAX17710) (i.e. www.maximintegrated.com/datasheet/index.mvp/id/7183) that converts power from energy harvesting devices to charge an energy storage device, with output levels ranging from 1 µW to 100 mW, and also features selectable output voltages of 3.3V, 2.3V, or 1.8V. When a boost charger is in operation, the power consumption of the Energy-Harvesting Charger and Protector is approximately 1 µW.

SUMMARY

In summary, as some remote sensors are arranged to operate using only tens to hundreds of microwatts of power, power management devices (e.g. the DC-DC converter) of the remote sensors have to be configured to consume minimal quiescent power to maintain high conversion efficiency. Conventionally, analog controllers and digital controllers for the DC-DC converter require DC biasing current and a certain amount of computing power, and thus a substantial amount of quiescent power is consumed which undesirably results in low conversion efficiency for low power levels.

The proposed controller 200, 10000 discussed in afore embodiments advantageously enables the DC-DC converter 100, 11000 to regulate voltages of the electrical devices 106, 108, 110 by measuring the voltages and comparing against respective reference voltages at certain intervals to obtain voltage comparison results. In between the intervals, the controller 200, 10000 enters into a sleep mode to minimize power loss. Based on the voltage comparison results, the controller 200, 10000 uses Pulse-Skipping Modulation (PSM) and Pulse-Frequency Modulation (PFM) (which are implemented using flip-flops and logic gates) to adjust the voltages of the electrical devices 106, 108, 110, and a frequency for performing the voltage comparison so that the quiescent power consumption and power conversion efficiency are optimized according to the power level measured. As performing Pulse-Skipping Modulation (PSM) and Pulse-Frequency Modulation (PFM) require no computing power or analog components that consume DC biasing current, the quiescent power of the DC-DC converter 100, 11000 is beneficially optimized to ensure high conversion efficiency.

Variations

The described embodiments should not however be construed as limitative. For example, in a switching cycle, multiple switch pairs 102a, 102b, 104 may be selected for activation (instead of only one switch pair 102a, 102b, 104) so that multiple source and load pairs may be selected for simultaneous transfer of excess electrical energy. Moreover, the Pulse-Skipping Modulation (PSM) and Pulse-Frequency Modulation (PFM) may be independently implemented and performed without requiring the other, if desired for an intended application. In addition, for the Pulse-Frequency Modulation (PFM), the switching frequency may be configured to be increased/decreased to any appropriate frequency desired, based on circumstances. Also, the predetermined number of times in the definition of "consecutively determined" with reference to FIGS. 5a and 5b may be specified to any number of times required, and not necessary to two or three times as afore described for FIGS. 5a and 5b.

Further, for the first embodiment, a H-bridge architecture is used and implemented (as shown in FIG. 1), with ground connecting switches (i.e. labelled as $M_{N1}$ and $M_{N2}$). While the H-bridge architecture enables outputs with voltages higher or lower than the input voltages to be connected, the DC-DC converter 100 is not restricted to using only the H-bridge architecture. Also, the proposed scheme of using PSM and PFM in tandem is applicable to any DC-DC converter architecture. Examples include the boost converter (i.e. the ground connecting switch labelled as "$M_{N1}$" is removed with reference to FIG. 1) or the buck converter (i.e. the ground connecting switch labelled as "$M_{N2}$" is removed with reference to FIG. 1). It is also to be appreciated that if the boost converter architecture is used with only one input source (i.e. $V_{B1}$), no switches are then required at the input source and a minimum number of switches to select is one, in relation to the destination loads.

Another variation is that more than one switch in a set of input/output switches 102a, 102b, 103, 104 may be switched on in every switching cycle, but time multiplexed. For example, with reference to the first set of input switches 102a, if $t_{ON}$ is defined to be 600 ns, then for the first portion of the said $t_{ON}$, say 300 ns, a first switch (i.e. $M_{EH1}$) from the first set of input switches 102a is switched on and for the next 300 ns, the first switch is switched off while a second switch (i.e. $M_{EH2}$) from the first set of input switches 102a is then switched on.

The above described Bandgap Reference 204 is only an example of a reference voltage generator. Any other reference generators may be implemented as required by an intended application. For example, a BJT or zener diode may be used to generate a reference voltage if a highly accurate reference is not required. For some other applications, the reference voltage may be generated externally and fed directly to the proposed controller 200, 10000.

In addition, the SYS_CLK clock signal 214 may not necessary need to be generated by the Dual Threshold CMOS Relaxation Oscillator 2022 and the n-bit counter 2026 as described above. Any oscillator, such as a crystal oscillator, a ring oscillator or a Phase-Locked-Loop, may also be usable. Moreover, the SYS_CLK clock signal 214 may also be generated externally and provided to the proposed controller 200, 10000. Accordingly, under such an instance, the frequency varying unit 202 is then configured to receive the SYS_CLK clock signal 214 provided thereto.

The reference threshold voltages may be generated by any types of DAC and is not limited to the CDAC 2066, 12066 as proposed. Although the CDAC 2066, 12066 generally consumes the lowest amount of power, other DACs including resistive tree, R-2R DAC, I-2I DAC and sigma-delta DAC are all equally applicable.

Further, the CDAC 2066, 12066 is not confined to using an 8-bits resolution; depending on requirements of an intended application, the resolution adopted may vary.

Also, if an ADC is used to digitize the voltages, the voltage comparison may be performed digitally, instead of using the Double-Tail Latch-Type Dynamic Comparator for the dynamic comparator 20610, as described above. In this variation, an ADC is thus required to digitize the voltages instead having to use the DAC to convert the digital reference voltages to their analog equivalents. It is however to be appreciated that an ADC generally consumes more power than a DAC.

The memory device 2064 is required only if the threshold reference voltage is required to be programmed and stored in the memory device 2064. The memory device 2064 may also be arranged external to the proposed controller 200 (of FIG. 2), such that the threshold reference voltage is provided from externally to the proposed controller 200, 10000. Alternatively, the threshold reference voltage may also be hard-wired internally of the proposed controller 200, 10000.

The MPPTs 2062 may not be necessary, if MPP tracking is not required by an application. Some energy harvesting devices, especially low cost ones, are regulated at a constant voltage regardless of the environmental conditions. Other than operating in DCM mode, Pseudo-Continuous-Conduction Mode (PCOM) may also be implemented (albeit more complex) for the proposed controller 200, 10000, whereby instead of allowing the inductor current to return to zero after every switching cycle, an additional switch is added across the inductor so that some current is allowed to circulate across the inductor at the end of each switching cycle.

It is further to be appreciated that there are many ways in which the voltages of the electrical devices 106, 108, 110 may be compared to the respective reference voltages, including (for example) converting the associated voltages into corresponding currents and comparing with reference currents, or alternatively converting the associated voltages into corresponding time delays and comparing with reference time delays. In other words, the electrical parameters of the electrical devices 106, 108, 110 may be used for the comparison (with reference electrical parameters), which is not strictly limited to only voltage comparisons alone, as will be appreciated. Moreover, the associated voltages of the electrical devices 106, 108, 110 may also be digitized and compared digitally, in contrast to the described in the first embodiment.

While the invention has been illustrated and described in detail in the drawings and foregoing description, such illustration and description are to be considered illustrative or exemplary, and not restrictive; the invention is not limited to the disclosed embodiments. Other variations to the disclosed embodiments can be understood and effected by those skilled in the art in practising the claimed invention.

REFERENCES

[1]. J. Choi, et al., "A 1.36 μW Adaptive CMOS Image Sensor with Reconfigurable Modes of Operation from Available Energy/Illumination for Distributed Wireless Sensor Network," in *IEEE Int. Solid-State Circuits Conf. (ISSCC) Dig. Tech. Papers*, February 2012, pp. 112-114.

[2]. Y. Qiu, et al., "5 μW-to-10 mW Input Power Range Inductive Boost Converter for Indoor Photovoltaic Energy Harvesting with Integrated Maximum Power Point Tracking Algorithm," in *IEEE Int. Solid-State Circuits Conf. (ISSCC) Dig. Tech. Papers,* 20-24 Feb. 2011, 2011, pp. 118-120.

[3]. Y. K. Tan and S. K. Panda, "Energy Harvesting from Hybrid Indoor Ambient Light and Thermal Energy Sources for Enhanced Performance of Wireless Sensor Nodes," *IEEE Trans. Ind. Electron.*, vol. 58, pp. 4424-4435, September 2011.

[4]. I. Doms, et al. "Integrated Capacitive Power-Management Circuit for Thermal Harvesters with Output Power 10 to 1000 μW," in *IEEE Int. Solid-State Circuits Conf. (ISSCC) Dig. Tech. Papers,* 8-12 Feb. 2009, 2009, pp. 300-301a.

[5]. N.-M. Sze, et al., "Integrated Single-Inductor Dual-Input Dual-Output Boost Converter for Energy Harvesting Applications," in *Proc. IEEE Int. Symp. Circuits Syst. (ISCAS)*, Seattle, Wash., 2008, pp. 2218-2221.

[6]. A. Tabesh and L. G. Frechette, "A Low-Power Stand-Alone Adaptive Circuit for Harvesting Energy from a Piezoelectric Micropower Generator," *IEEE Trans. Ind. Electron.*, vol. 57, pp. 840-849, 2010.

[7]. R. C. H. Chang, et al., "An Exact Current-Mode PFM Boost Converter with Dynamic Stored Energy Technique," *IEEE Trans. Power Electron.*, vol. 24, pp. 1129-1134, April 2009.

[8]. S. Bandyopadhyay, et al., "20 μA to 100 mA DC-DC Converter with 2.8-4.2 V Battery Supply for Portable Applications in 45 nm CMOS," *IEEE J. Solid-State Circuits*, vol. 46, pp. 2807-2820, December 2011.

[9]. D. Schinkel, et al., "A Double-Tail Latch-Type Voltage Sense Amplifier with 18 ps Setup+Hold Time," in *IEEE Int. Solid-State Circuits Conf. (ISSCC) Dig. Tech. Papers,* 2007, pp. 314-605.

[10]. M. Van Elzakker, et al., "A 10-Bit Charge-Redistribution ADC Consuming 1.9 μW at 1 MS/s," *IEEE J. Solid-State Circuits*, vol. 45, pp. 1007-1015, May 2010.

The invention claimed is:

1. A controller for a power converter having a plurality of switches couplable to respective electrical devices, the controller comprising:
a switch activating unit for activating the switches;
a frequency varying unit;
a comparator configured to compare respective electrical parameters of the electrical devices with respective reference electrical parameters to obtain associated results; and
a selector configured to select based on the results, either no switches or at least one switch to be activated to enable at least two electrical devices to be electrically connected,
wherein the activation is performed on receipt of a signal pulse, and if no switches are selected, the signal pulse is skipped by the switch activating unit to reduce power consumption of the controller,
wherein based on the results, a frequency of the signal pulse is varied by the frequency varying unit to further reduce power consumption of the controller,
and wherein the comparator and selector are configured to be switched off prior to receipt of the signal pulse.

2. The controller of claim 1, wherein the plurality of electrical devices include energy storage devices, energy harvesting devices and voltage regulatable devices, and wherein the switches include at least first to fourth sets of switches to selectably connect an energy harvesting device and a voltage regulatable device, or an energy storage device and a voltage regulatable device, or an energy storage device and an energy harvesting device.

3. The controller of claim 2, wherein the energy storage devices include batteries and/or ultra-capacitors.

4. The controller of claim 2, wherein the energy harvesting devices include photovoltaic cells and/or piezoelectric micro-power generators.

5. The controller of claim 2, wherein the first set of switches is configured to be coupled to the energy harvesting devices, the second set of switches is configured to be coupled to the energy storage devices, the third set of switches is configured to be coupled to the voltage regulatable devices, and the fourth set of switches is configured to be coupled to the energy storage devices.

6. The controller of claim 1, wherein the comparator includes a memory device to store digital codes corresponding to at least some of the reference electrical parameters.

7. The controller of claim 6, wherein the comparator further includes a Digital-to-Analog Converter (DAC) to convert the digital codes into the at least some of the reference electrical parameters.

8. The controller of claim 7, wherein the DAC includes a Capacitive DAC (CDAC) and has a resolution of 8-bits.

9. The controller of claim 1, wherein the comparator includes a double-tail latch-type dynamic comparator.

10. The controller of claim 1, wherein the frequency varying unit is configured to periodically generate the signal pulse.

11. The controller of claim 1, wherein the frequency varying unit is configured to receive the signal pulse.

12. The controller of claim 1, wherein the frequency varying unit includes a dual threshold CMOS relaxation oscillator having a dynamic threshold inverter.

13. The controller of claim 12, wherein the dynamic threshold inverter is arranged to use two different threshold voltages to periodically generate the signal pulse.

14. The controller of claim 1, wherein activation of the at least one switch includes sequentially activating the at least one switch to enable transfer of electrical energy between the at least two electrical devices.

15. The controller of claim 2, wherein the electrical parameters include voltages.

16. The controller of claim 15, wherein no switches are selected if no energy harvesting device has a voltage higher than a first reference voltage being compared with, and no voltage regulatable device has a voltage lower than a second reference voltage being compared with.

17. The controller of claim 1, wherein the comparator is further configured to compare the electrical parameters of the electrical devices with the reference electrical parameters upon receipt of the signal pulse.

18. The controller of claim 15, wherein varying the frequency includes increasing the frequency if at least one energy harvesting device is consecutively determined to have a voltage higher than a first reference voltage being compared with, or at least one voltage regulatable device is consecutively determined to have a voltage lower than a second reference voltage being compared with.

19. The controller of claim 18, wherein increasing the frequency includes doubling the frequency.

20. The controller of claim 15, wherein varying the frequency includes decreasing the frequency if at least one energy harvesting device is consecutively determined to have a voltage lower than a first reference voltage being compared with, or at least one voltage regulatable device is consecutively determined to have a voltage higher than a second reference voltage being compared with.

21. The controller of claim 20, wherein decreasing the frequency includes halving the frequency.

22. The controller of claim 7, wherein the comparator further includes:
a voltage multiplexer configured to receive the respective electrical parameters of the electrical devices to generate a first signal;
a digital reference multiplexer configured to receive the respective reference electrical parameters to generate a second signal; and
a dynamic comparator configured to receive the first and second signals for performing the comparison.

23. A power converter having a controller and a plurality of switches couplable to respective electrical devices,
wherein the controller includes a switch activating unit for activating the switches; a frequency varying unit; a comparator configured to compare respective electrical parameters of the electrical devices with respective reference electrical parameters to obtain associated results; and a selector configured to select based on the results, either no switches or at least one switch to be activated to enable at least two electrical devices to be electrically connected, and
wherein the activation is performed on receipt of a signal pulse, and if no switches are selected, the signal pulse is skipped by the switch activating unit to reduce power consumption of the controller,
wherein based on the results, a frequency of the signal pulse is varied by the frequency varying unit to further reduce power consumption of the controller,
and wherein the comparator and selector are configured to be switched off prior to receipt of the signal pulse.

24. The power converter of claim 23, wherein the power converter is configured for a wireless sensor operable using energy harvesting.

25. A method of operating a controller for a power converter having a plurality of switches couplable to respective electrical devices, the controller including a switch activating unit, a frequency varying unit, a comparator and a selector, the method comprising:
- comparing respective electrical parameters of the electrical devices with respective reference electrical parameters by the comparator to obtain associated results; and
- based on the results, selecting by the selector either no switches or at least one switch to be activated to enable at least two electrical devices to be electrically connected,
- wherein the activation is performed on receipt of a signal pulse, and if no switches are selected, the signal pulse is skipped by the switch activating unit to reduce power consumption of the controller, and
- wherein based on the results, a frequency of the signal pulse is varied by the frequency varying unit to further reduce power consumption of the controller,
- and wherein the comparator and selector are configured to be switched off prior to receipt of the signal pulse.

* * * * *